United States Patent
Walter et al.

(10) Patent No.: US 6,824,642 B2
(45) Date of Patent: Nov. 30, 2004

(54) PHENYL-LINKED OXAZOLE CYANATES AS DIELECTRICS HAVING GOOD ADHESIVE AND FILLING PROPERTIES

(75) Inventors: Andreas Walter, Egloffstein (DE); Recai Sezi, Rottenbach (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/206,505

(22) Filed: Jul. 26, 2002

(65) Prior Publication Data

US 2003/0060573 A1 Mar. 27, 2003

(30) Foreign Application Priority Data

Jul. 26, 2001 (DE) .......................................... 101 36 382

(51) Int. Cl.[7] .......................... C09J 179/00; C08L 73/06

(52) U.S. Cl. ..................... 156/331.5; 156/147; 156/148; 156/330.9; 528/176; 528/179; 528/183; 528/188; 528/210; 528/219

(58) Field of Search ................................. 528/176, 183, 528/188, 179, 210, 219; 156/147, 148, 330.9, 331.5

(56) References Cited

FOREIGN PATENT DOCUMENTS

DE          44 32 965          1/1996

*Primary Examiner*—Ana Woodward
(74) *Attorney, Agent, or Firm*—Jenkins, Wilson & Taylor, P.A.

(57) ABSTRACT

The following invention relates to phenyl-linked polybenzoxazoles having terminal, aryl- or heteroaryl-attached cyanate groups which can be used for adhesive bonding and as dielectrics, especially for electronic components, and to a process for preparing them.

22 Claims, 2 Drawing Sheets

Fig. 2
Fig. 2a
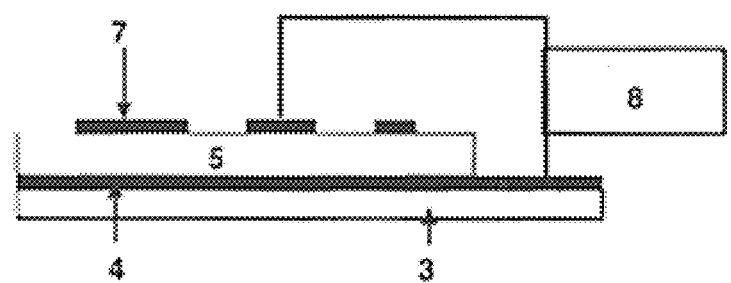
Fig. 2b
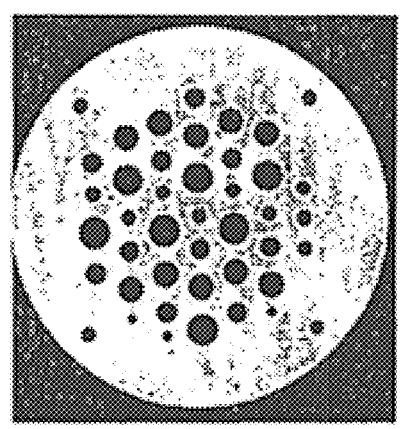

PHENYL-LINKED OXAZOLE CYANATES AS DIELECTRICS HAVING GOOD ADHESIVE AND FILLING PROPERTIES

TECHNICAL FIELD

The present invention relates to phenyl-linked polybenzoxazoles having terminal, aryl- or heteroaryl-attached cyanate groups which can be used for adhesive bonding and as dielectrics, especially for electronic components, and to a process for preparing them.

BACKGROUND ART

There is a need in microelectronics for highly heat-stable polymers as protective coats and insulating coats. Accordingly, these polymers can be used as dielectrics between two metal tracks and/or metal planes, in the case, for example, of multichip modules, memory chips and logic chips, or as a buffer coat (Buffer code) between the chip and its housing.

Some of these polymers, such as precursors of aromatic polyimides (PI) or polybenzoxazoles (PBO), exhibit good solubility in organic solvents and also good film-forming properties and can be applied to the electronic components by means of inexpensive control technology. Following a temperature treatment, such precursors are transformed or cyclized to give the PI or PBO (see scheme for PBO below in this respect) and so acquire their ultimate properties. An alternative is to prepare these polymers in cyclized form already, although the solubility of these ready-cyclized polymers is reduced.

Scheme:

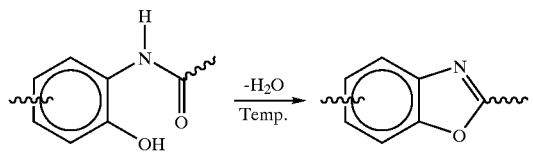

In the course of the cyclization, water is liberated. Normally, this does not give rise to any problems as far as the application is concerned. For particular applications, however, this may be problematic if the water finds it very difficult or impossible to escape by diffusion. The consequence is blistering or cracking.

In chip technology it is necessary, for example, to fill very narrow trenches between the metallic conductor tracks with an insulator, the dielectric. The aspect ratios (ratio of feature height to feature width) may be well over 4, with the width of the trenches being, for example, only 100 nm. In such cases materials are needed which not only exhibit a good insulating effect but also exhibit very good adhesion and filling properties. In this context, adhesion both to the sidewalls and to the base is important. No water must be liberated, by cyclization, for example, since in these cases the water is virtually unable to escape by diffusion, and produces blisters. A chemical reaction which lowers the solubility of the material and ensures that the ultimate properties are obtained (crosslinking or cyclization) must not then include any elimination of any constituents whatsoever.

For use in microelectronics, the materials must also withstand operating temperatures up to 450° C. or more without problems and must be stable toward process chemicals, such as solvents, strippers (solvents or substances for removing photoresists), bases, acids or aggressive gases.

SUMMARY OF THE INVENTION

One objective of the present invention is to provide novel insulating polymers (dielectrics) which combine good electrical insulation and sufficient temperature stability with very good adhesive and filling properties and which do not give off any constituents on crosslinking.

The state of the art has attempted to solve these problems by means, for example, of benzocyclobutenes (Dow Chemical, ref.: H. W. Boone, D. W. Smith, D. A. Babb, Polymer Preprints Vol. 39, No. 2, p. 812f.), which were also employed in microelectronics. These materials, however, do not exhibit sufficient adhesion and are not sufficiently temperature-stable. DE 44 32 965 C1 disclosed polycyanurate materials which can be used for adhesive bonding. The adhesiveness of these materials, however, is not sufficient for many adhesive applications, especially in the manufacture of electronic components.

The present invention accordingly provides, according to claim 1, phenyl-linked polybenzoxazoles which contain terminal, aryl- or heteroaryl-attached cyanate groups.

Provided in particular are inventive polybenzoxazoles of the following general formula (I):

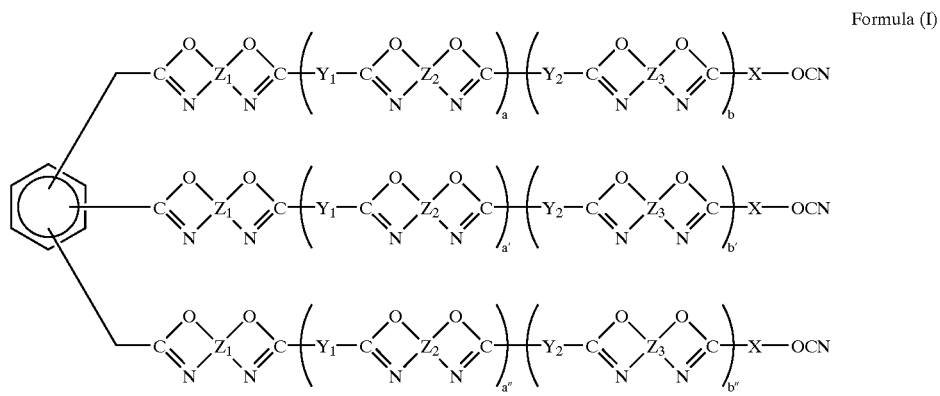

Formula (I)

where for a, a', a", b, b' and b" independently of one another it is the case that:

a, a', a"=0–100;
b, b', b"=0–100;

X has the following definition: substituted or unsubstituted aryl, a substituted or unsubstituted polynuclear aromatic hydrocarbon compound, a substituted or unsubstituted fused ring system or a substituted or unsubstituted heterocyclic radical;

$Y_1$ and $Y_2$ have the following definition, it being possible for $Y_1$ to be the same as or not the same as $Y_2$:

substituted or unsubstituted aryl, a substituted or unsubstituted polynuclear aromatic hydrocarbon compound, a substituted or unsubstituted fused ring system, or alkyl, alkenyl, alkynyl, aralkyl, aralkenyl, aralkynyl, heterocyclo or cycloalkenyl, each substituted or unsubstituted;

and $Z_1$ to $Z_3$ each independently of one another have the following definition:

aryl, aralkyl, aralkenyl, aralkynyl, heteroaryl, each substituted or unsubstituted, a substituted or unsubstituted polynuclear aromatic hydrocarbon compound or a substituted or unsubstituted fused ring system.

The present invention further relates to a process for preparing polybenzoxazoles of the general formula (I), comprising the following steps:

a. reacting a bisaminophenol of the formula $H_2N$—$(HO)Z_1$(OH)—$NH_2$ and/or $H_2N$—$(HO)Z_2(OH)$—$NH_2$ and/or $H_2N$—$(HO)Z_3(OH)$—$NH_2$ with benzene-1,3,5-tricarboxylic acid, then optionally with a compound for introducing the group $Y_1$ and/or $Y_2$, and then with a compound for introducing the group X—OH, to give a phenyl-linked polybenzoxazole having terminal, aryl- or heteroaryl-attached hydroxyl groups;

b. reacting the phenyl-linked polybenzoxazoles obtained in step a. and containing terminal, aryl- or heteroaryl-attached hydroxyl groups with cyanogen bromide to give phenyl-linked polybenzoxazoles having terminal, aryl- or heteroaryl-attached cyanate groups;

$Z_1$, $Z_2$, $Z_3$, X, $Y_1$ and $Y_2$ being as defined above.

The present invention further relates to the use of polybenzoxazoles of the general formula (I) as dielectrics in electronic components and for adhesive bonding.

DETAILED DESCRIPTION OF THE INVENTION

The present invention relates to phenyl-linked polybenzoxazoles having terminal, aryl- or heteroaryl-attached cyanate groups, especially polybenzoxazole cyanates of the above-indicated formula (I).

It is preferred if a, a' and/or a" in the formula (I) independently of one another are 0–20, more preferably 1–20, and/or b, b' and/or b" independently of one another are 0–20, more preferably 1–20.

Particular preference is further given to:

compounds where X has the following definition:

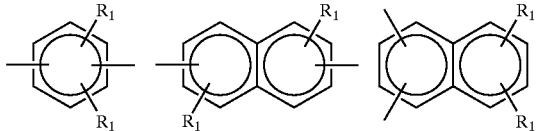

-continued

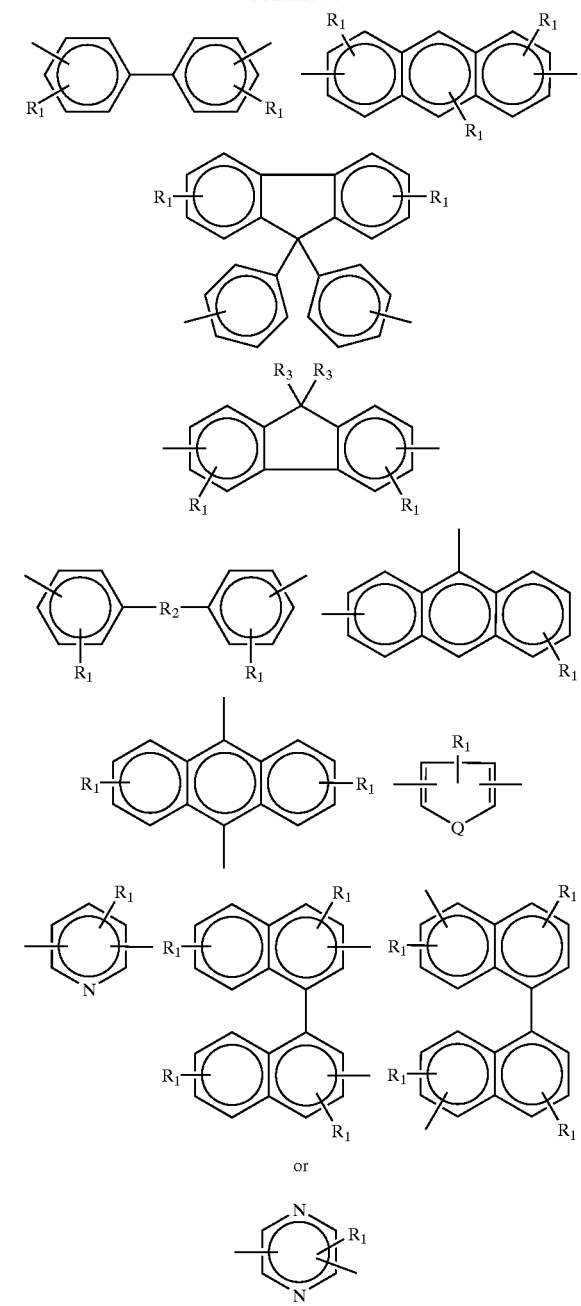

or

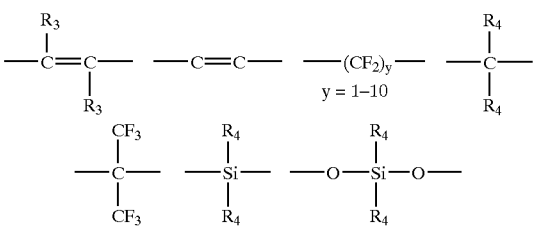

where Q is: —O—, S— or —NH—;

$R_1$ is: —H, —$CF_3$, —OCN, alkyl or aryl;

$R_2$ is: —O—, —CO—, —$NR_3$—, —S—, —$SO_2$—, —$S_2$—, —$CH_2$—, and also:

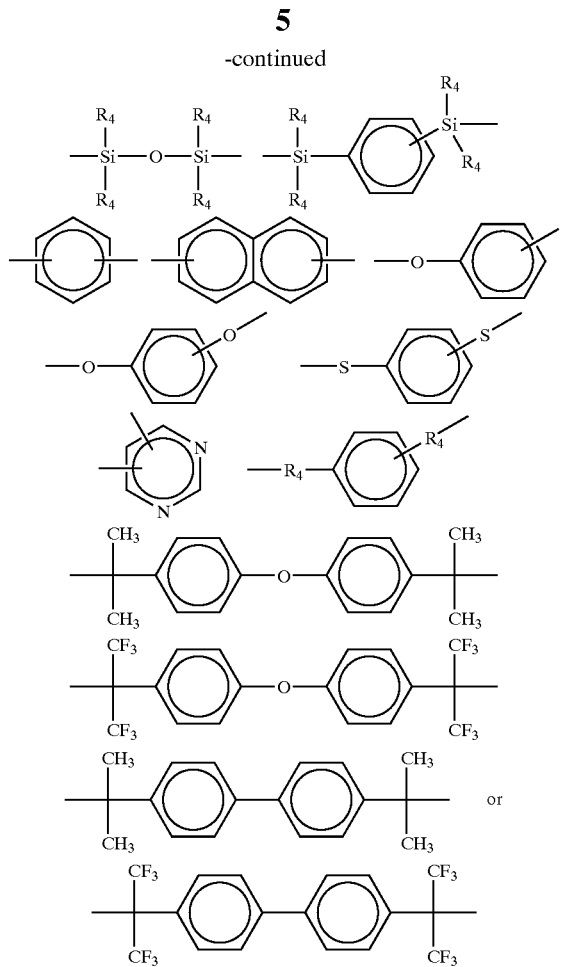
$R_3$ is: —H, and also:
—(CH$_2$)$_k$—CH$_3$ (k=0–10)   —(CF$_2$)$_k$—CF$_3$ (k=0–10)
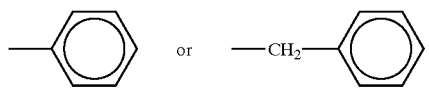
and $R_4$ is: alkyl having from 1 to 10 carbon atoms or aryl.
Preference is further given in accordance with the invention to polybenzoxazoles of the formula (I) having terminal, aryl- or heteroaryl-attached cyanate groups wherein $Y_1$ and $Y_2$, where $Y_1$ can be the same as or not the same as $Y_2$, are:
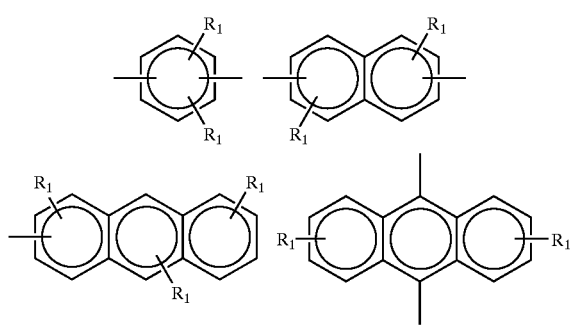
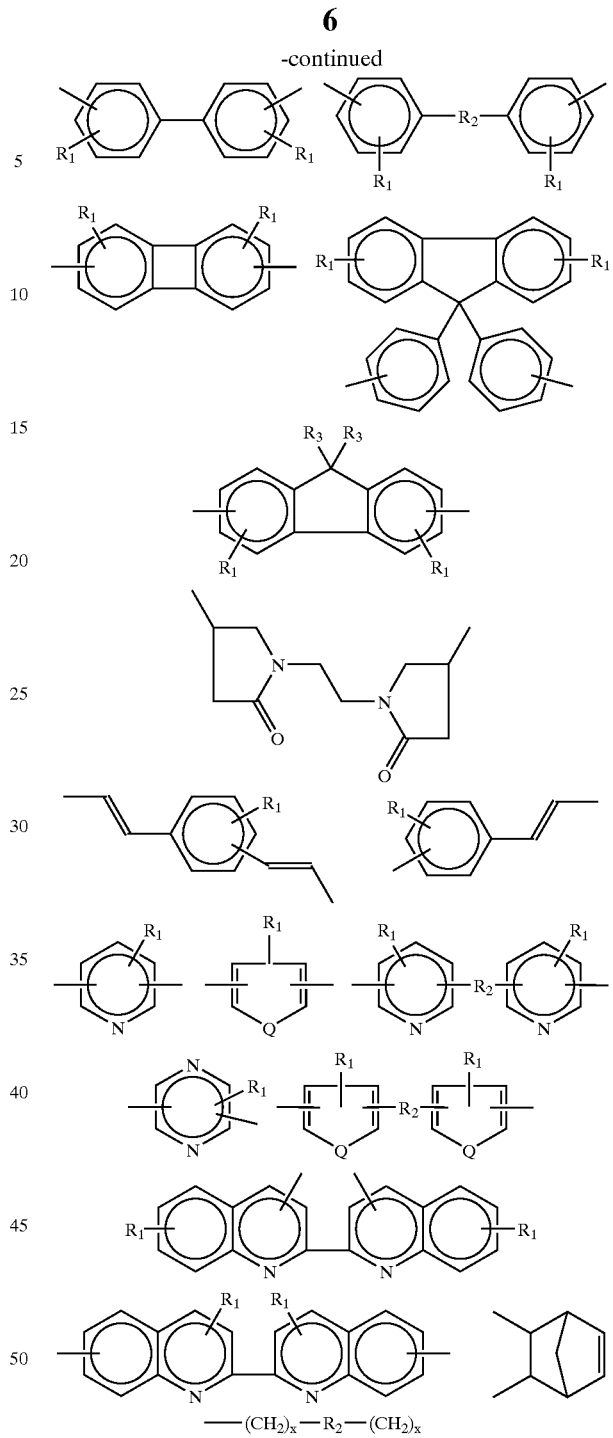
(x = 1–10); if $R_2$ = —CH$_2$—, then x = 0–10
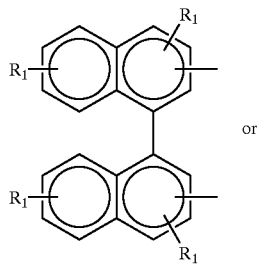

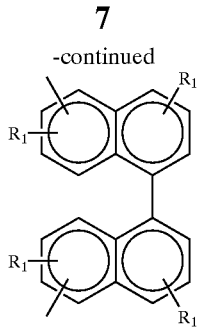

where $R_1$, $R_2$, $R_3$ and Q are as defined above.

Preference is additionally given in accordance with the invention to polybenzoxazoles having terminal, aryl- or heteroaryl-attached cyanate groups of the formula (I) wherein $Z_1$, $Z_2$ and $Z_3$, it being possible for $Z_1$ to $Z_3$ to be the same as or not the same as one-another, are:

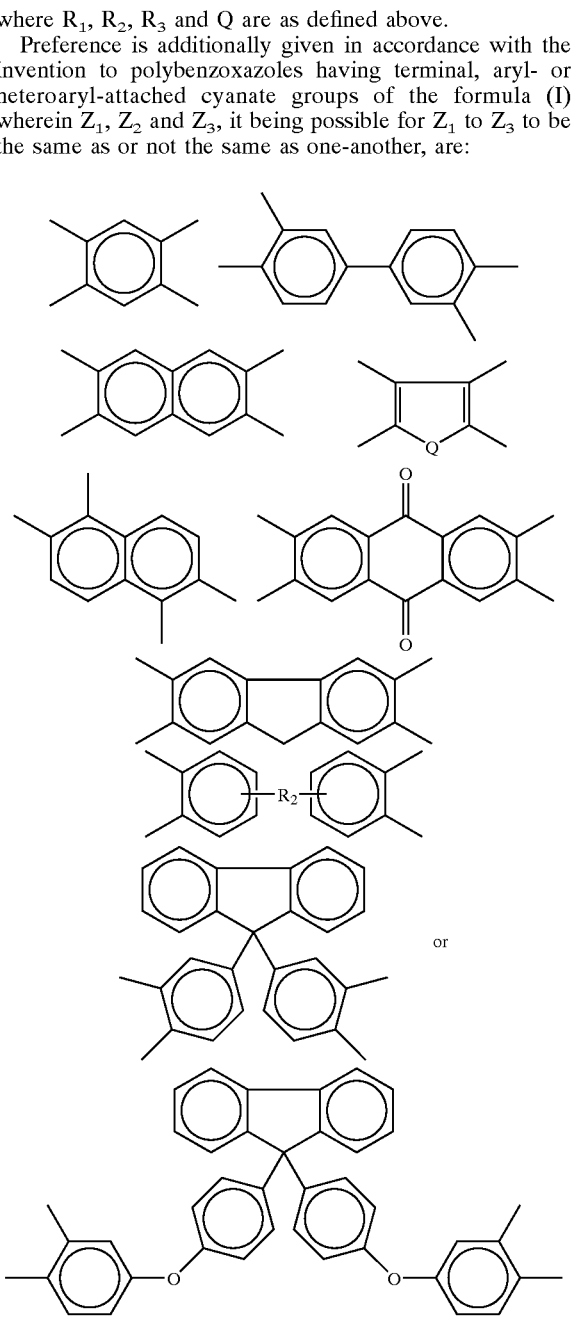

where Q and $R_2$ are as defined above 5 [sic].

In the definition of $Y_1$ and $Y_2$, suitable examples of polynuclear aromatic hydrocarbon radicals are fused ring systems and heterocyclic compounds: biphenyl, anthracene, naphthalene, fluorene, pyrene, thiophene, thiazole or benzothiazole, imidazole or benzimidazole, pyrrole, furan, pyridine or pyrazine or derivatives thereof.

Suitable examples of polynuclear aromatic hydrocarbon radicals, fused ring systems, and heterocyclic compounds for $Z_1$ to $Z_3$ are biphenyl, anthracene, anthraquinone, fluorene, pyrene, thiophene, thiazole or benzothiazole, imidazole or benzimidazole, pyrrole, furan, pyridine, pyrazine or derivatives thereof.

Particularly preferred radicals for $Z_1$ and/or $Z_2$, and/or $Z_3$, are:

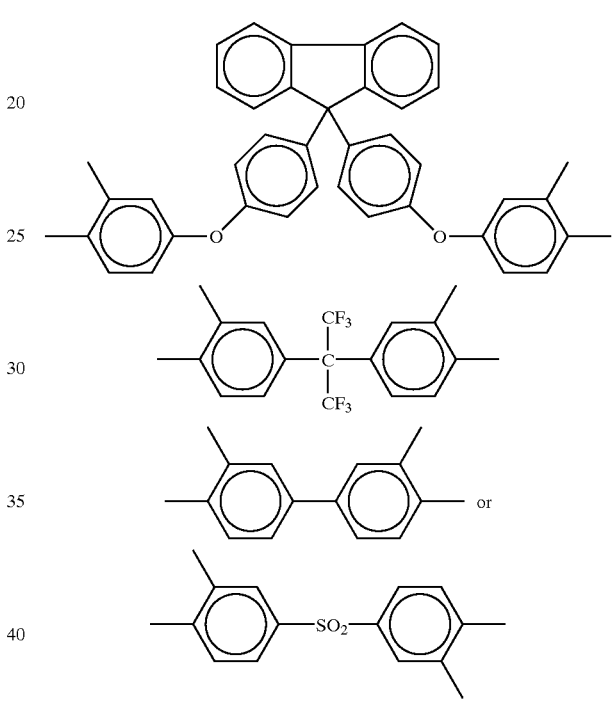

Particularly preferred radicals for $Y_1$ and/or $Y_2$ are:

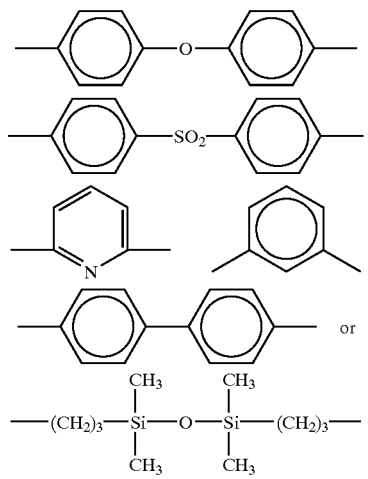

Particularly preferred radicals for X are:

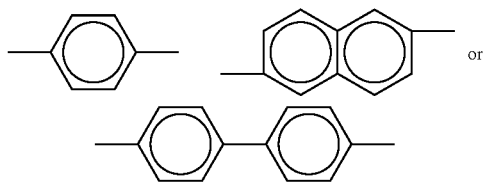

In accordance with the invention, the oxazole cyanates of the formula (I) can be prepared in two steps:
  a. reacting bisaminophenol of the formula $H_2N$—$(HO)Z_1(OH)$—$NH_2$ and/or $H_2N$—$(HO)Z_2(OH)$—$NH_2$ and/or $H_2N$—$(HO)Z_3(OH)$—$NH_2$ with benzene-1,3,5-tricarboxylic acid, then optionally with a compound for introducing the group $Y_1$ and/or $Y_2$, and then with a compound for introducing the group X—OH, to give a phenyl-linked polybenzoxazole having terminal, aryl- or heteroaryl-attached hydroxyl groups;
  b. reacting the phenyl-linked polybenzoxazoles obtained in step a. and containing terminal, aryl- or heteroaryl-attached hydroxyl groups with cyanogen bromide to give phenyl-linked polybenzoxazoles having terminal, aryl- or heteroaryl-attached cyanate groups.

On Step a:

This reaction can be performed in a variety of ways in accordance with the invention.

In accordance with the invention, for example, the compound for introducing the group $Y_1$ and/or $Y_2$ is preferably a dicarboxylic acid of the formula HOOC—$Y_1$—COOH and/or HOOC—$Y_2$—COOH, the compound for introducing the group X is preferably a hydroxy carboxylic acid of the formula HO—X—COOH, and the reaction of step a. takes place in the presence of phosphorus pentoxide. This leads directly to the formation of a cyclized, phenyl-linked polybenzoxazole containing aryl- or heteroaryl-attached hydroxyl end groups.

In this reaction the hydroxyl group of the hydroxy carboxylic acid is preferably protected in order to prevent side reactions. Examples of suitable protected groups are alkyl groups, e.g., tert-butyl, alkylcarbonyl groups, preferably acetyl groups, benzoyl groups or alkylbenzoyl groups. The removal of the protective group to give polybenzoxazoles containing aryl- or heteroaryl-attached hydroxyl end groups takes place in accordance with known techniques. For example, an alkylcarbonyl protective group, such as the acetyl group, can be eliminated in dimethylformamide and ammonia. In the case of an alkyl protective group, the elimination can be accomplished by means of a strong acid such as hydrobromic acid, for example.

Examples of preferred solvents for the first reaction step include methanesulfonic acid, N-methylpyrrolidone, dimethylacetamide, dimethyl sulfoxide, γ-butyrolactone, polyphosphoric acid, a mixture of sulfuric acid and phosphoric acid, and mixtures of these solvents. In the case of this variant of the process, the solvent is in a mixture with phosphorus pentoxide, preferably with 5–10% by weight of phosphorus pentoxide, more preferably 7–8% by weight, based on the composition comprising solvent and phosphorus pentoxide.

Particular preference is given to a mixture of methanesulfonic acid and phosphorus pentoxide, preferably having a phosphorus pentoxide content of 5–10% by weight, more preferably 7–7.5% by weight.

In accordance with the invention, the reaction temperatures in step 1 are preferably between 50 and 150° C., the reaction times being between 1 hour and 20 hours, with from 4 hours to 12 hours being preferred.

The resulting polymer can be precipitated by dropwise addition of the reaction solution to a precipitating medium, followed by washing and drying. Suitable precipitating media are water, alcohols, such as isopropanol, butanol or ethanol, and mixtures of these precipitating media. The precipitating medium may preferably also contain up to 10% ammonia.

A further possibility for the reaction in accordance with the first reaction step is the reaction of a bis-o-aminophenol with benzene-1,3,5-tricarboxylic acid and then with a dicarboxylic acid and a hydroxy carboxylic acid in the presence of a carboxylic-acid-activating compound, such as carbonyldiimidazole or dicyclohexylcarbodiimide or hydroxysuccinimide or hydroxybenzotriazole, for example. In this case the compound for introducing the group $Y_1$ and/or $Y_2$ is a dicarboxylic acid of the formula HOOC—Y1-COOH and/or HOOC—Y2-COOH, the compound for introducing the group X is a hydroxy carboxylic acid of the formula HO—X—COOH, and the reaction of step a. takes place in the presence of a carboxylic-acid-activating group.

Solvents which can be used were again the solvents mentioned above for step a., but without the presence of phosphorus pentoxide.

In the case of this reaction the hydroxyl group of the hydroxy carboxylic acid is preferably protected in order to prevent side reactions. Suitable protective groups are, for example, alkyl groups, e.g., tert-butyl groups, alkylcarbonyl groups, preferably acetyl groups, benzoyl groups or alkylbenzoyl groups. The removal of the protective group to give phenyl-linked polybenzoxazoles containing aryl- or heteroaryl-attached hydroxyl end groups takes place in accordance with known techniques.

Thereafter the product can be cyclized in solution to give the polybenzoxazole having terminal, aryl- or heteroaryl-attached, hydroxyl groups. This is done preferably in the presence of a catalytic amount of acid by means of temperature treatment at a temperature of preferably from 150 to 200° C.

Suitable in principle are all reagents which per se bind the water formed during the reaction or which raise the reactivity of the carbonyl group. Preference is given, however, to the abovementioned compounds carbonyldiimidazole or dicyclohexylcarbodiimide or hydroxysuccinimide or hydroxybenzotriazole. The resulting polymer can be precipitated by adding the reaction solution dropwise to a suitable precipitating medium and then drying it. Suitable precipitating media are water, alcohols, such as isopropanol, butanol or ethanol, and mixtures of these precipitating media. The precipitating medium may preferably also include up to 10% of ammonia.

A further possibility for reaction in accordance with the first reaction step is the reaction of a bis-o-aminophenol with benzene-1,3,5-tricarbonyl trichloride and then with a dicarbonyl dichloride and a hydroxy carbonyl chloride in the presence of a base, such as pyridine, morpholine, pyrrole or triethylamine, for example.

In this case in step a. the compound for introducing the group $Y_1$ and/or $Y_2$ is a dicarbonyl chloride of the formula ClOC—$Y_1$—COCl and/or ClOC—$Y_2$—COCl or another reactive dicarboxylic acid derivative. "Reactive dicarboxylic acid derivative" means that the carbonyl groups have a higher carbonyl-group reactivity in comparison to the carboxylic acid. The compound for introducing the group X is a hydroxy carbonyl chloride of the formula HO—X—COCl or another reactive hydroxy carboxylic acid derivative. Step a. is conducted in the presence of an N-containing organic base.

Solvents which can be used are again the solvents mentioned above for step a., but without the presence of phosphorus pentoxide.

In the case of this reaction the hydroxyl group of the hydroxy carboxylic acid is preferably protected in order to prevent side reactions. Suitable protective groups are, for example, alkyl groups, e.g., tert-butyl groups, alkylcarbonyl groups, preferably acetyl groups, benzoyl groups or alkylbenzoyl groups. The removal of the protective group to give phenyl-linked polybenzoxazoles containing aryl- or heteroaryl-attached hydroxyl end groups takes place in accordance with known techniques.

Thereafter the product can be cyclized in solution to give the polybenzoxazole having terminal, aryl- or heteroaryl-attached, hydroxyl groups. This is done preferably in the presence of a catalytic amount of acid by means of temperature treatment at a temperature of preferably from 150 to 200° C.

The resulting polymer can be precipitated by adding the reaction solution dropwise to a suitable precipitating medium and then drying it. Suitable precipitating media are water, alcohols, such as isopropanol, butanol or ethanol, and mixtures of these precipitating media. The precipitating medium may preferably also include up to 10% of ammonia.

On Step b:

The second step in the process for preparing polybenzoxazole cyanates of the general formula (I) consists in reacting the phenyl-linked polybenzoxazoles obtained in step 1, containing terminal hydroxyl groups, with cyanogen bromide to give phenyl-linked polybenzoxazoles having terminal cyanate groups. In this case the dried polybenzoxazole having hydroxyaryl or hydroxyheteroaryl end groups can be reacted with cyanogen bromide in a suitable solvent, preferably in the presence of a base. After the end of the reaction the product can be precipitated from a precipitating medium, washed and dried. Suitable precipitating media are preferably aprotic solvents, such as hydrocarbons, halogenated hydrocarbons, aromatics containing no amine, thiol or hydroxyl groups, ethers, petroleum, mineral spirit, cyclohexane or toluene, and, in the cold (approximately 0 to 10° C.), water.

Particularly suitable bases are substances containing a tertiary nitrogen, such as triethylamine, dimethylbenzylamine or pyridine. Particularly suitable solvents for the second step of the polymer synthesis are γ-butyrolactone, acetone, ethyl acetate, halogenated hydrocarbons, aromatics containing no amine, thiol, or hydroxyl groups, or mixtures thereof. Suitable reaction temperatures are from −10° C. to 30° C., preferably from 0° C. to 20° C.

Instead of the precipitation mentioned the solvent may also be removed, in which case the temperature ought not to exceed 60° C.

The precipitated polymer is already suitable for use following filtration and drying.

The second reaction step may also take place by means of a phase transfer catalysis in water and an appropriate solvent, e.g., ethers, ethyl acetate, toluene, methylene chloride or chloroform, using cyanogen bromide and triethylamine as auxiliary base at from 0° C. to 20° C. to give the polybenzoxazole cyanate.

Given below is another preferred reaction scheme for preparing the compounds of the invention:

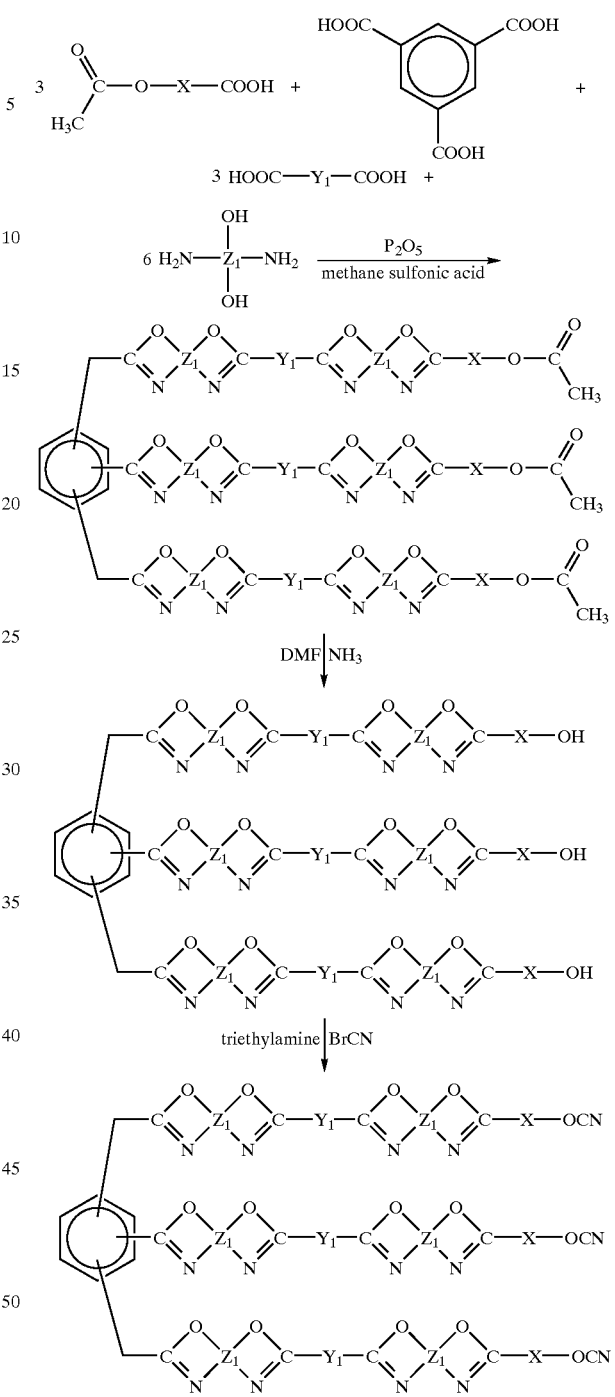

Here, the reaction in the first reaction step takes place preferably in methanesulfonic acid with 7% phosphorus pentoxide at 80–140° C. for from about 4 to 12 hours. Instead of the acetyl group the hydroxy carboxylic acid may also have been provided with another protective group. A protective alkylcarboxyl group, such as the acetyl group, is subsequently eliminated in dimethylformamide and ammonia. In the case of a protective alkyl group, elimination takes place by means of a strong acid such as hydrobromic acid, for example. The reaction product, a phenyl-linked polybenzoxazole having terminal, aryl- or heteroaryl-attached hydroxyl groups, is subsequently reacted to the end product, a phenyl-linked polybenzoxazole having terminal, aryl- or heteroaryl-attached cyanate groups, with BrCN in an aprotic solvent in the presence of triethylamine.

The polymers of the invention are readily soluble in many organic solvents, examples being acetone, cyclohexanone, diethylene glycol monoethyl ether, diethylene glycol diethyl ether, N-methylpyrrolidone, γ-butyrolactone, ethyl lactate, tetrahydrofuran, and ethyl acetate. The polybenzoxazoles of the invention are preferably in a concentration of 5–35% by weight, more preferably 15–30% by weight, based on the overall composition, the solvent in a concentration of 65–95% by weight, more preferably 70–85% by weight. The viscosity of the polymer solution can be controlled by varying the dissolved mass of polybenzoxazole cyanate.

The solution of polybenzoxazole cyanates of the invention and organic solvents may further contain, based on the overall composition, preferably 0.1–15% by weight, more preferably 0.5–10% by weight, of a crosslinker. Through the use of crosslinkers it is possible to exert a positive influence on the cure behavior, the adhesive properties, the strength, and also the thermal and chemical stability of the polybenzoxazole cyanurates. As crosslinkers in this case it is possible preferably to use short-chain compounds containing at least two cyanurate groups. Examples are indicated in the formulae below. These crosslinkers may be added to the polymer solution preferably at from 0.1 to 15% by weight based on the overall composition. With preference it is possible in accordance with the invention to use the following compounds as crosslinkers:

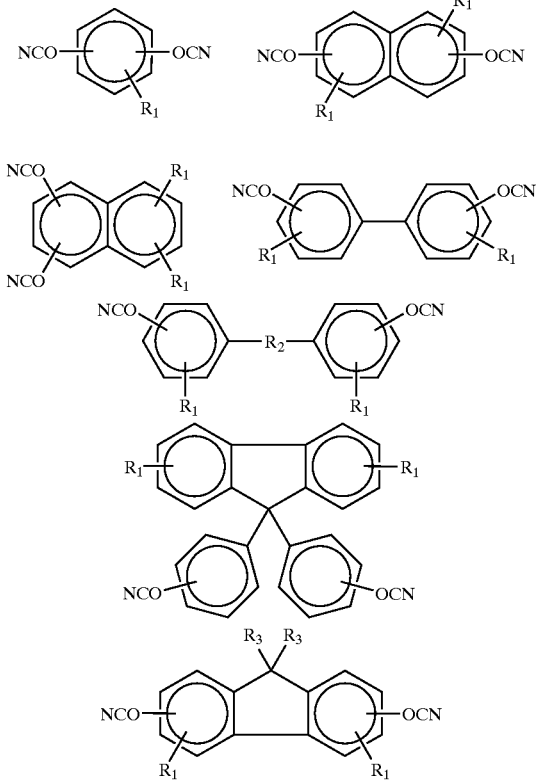

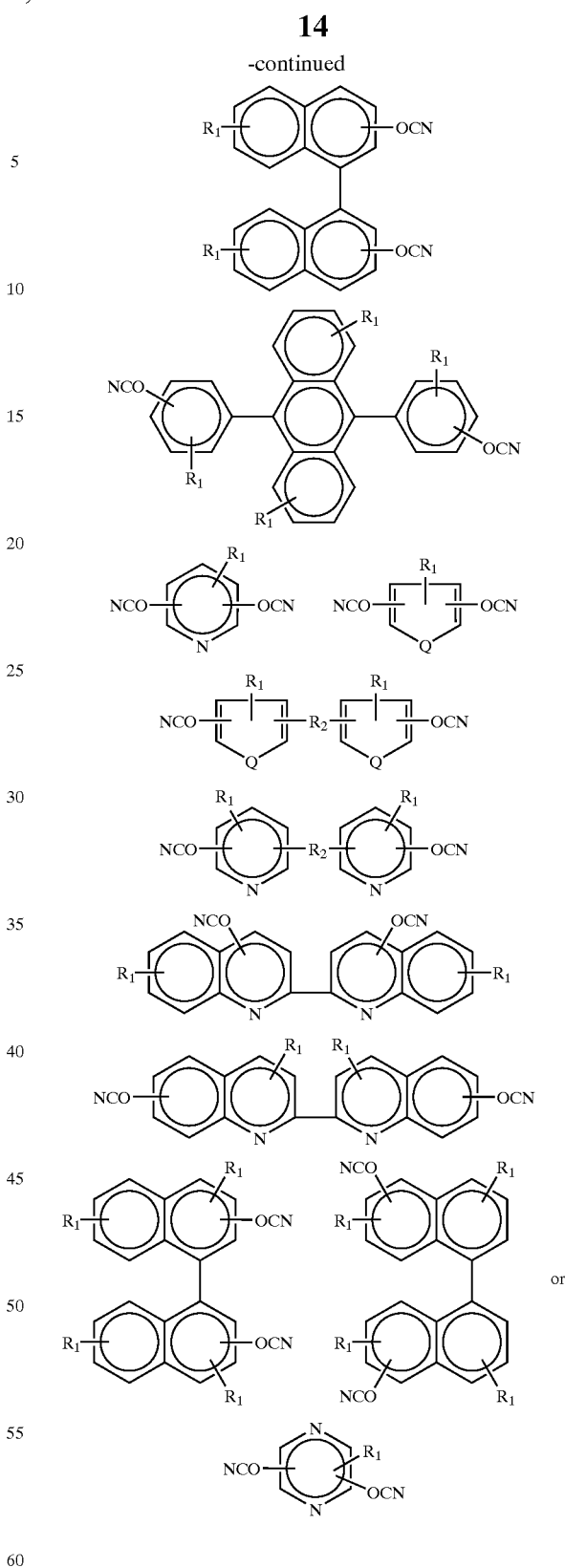

where $R_1$, $R_2$, $R_3$, and Q are as defined above.

In accordance with the invention the crosslinking reaction proceeds preferably in accordance with the following scheme, to produce polybenzoxazole cyanurates:

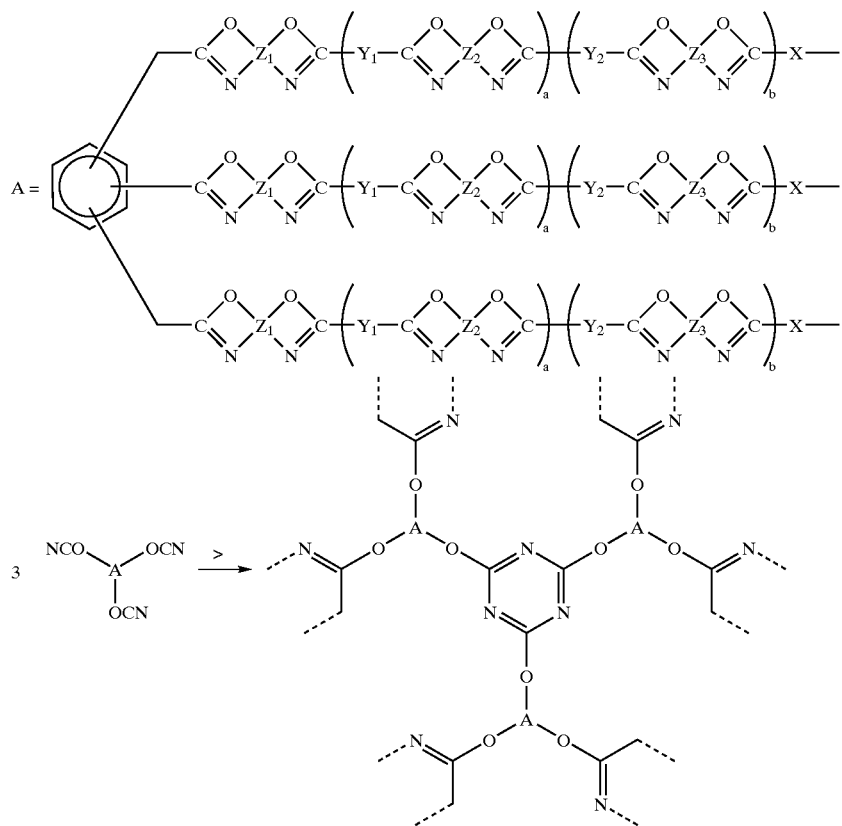

The crosslinking of the polybenzoxazole cyanates to give the polybenzoxazole cyanurates takes place preferably under the action of temperature, more preferably at from 200° C. to 400° C., but may also take place by means of laser treatment, ultrasound or microwave treatment.

The polybenzoxazole cyanates of the present invention can be used with preference for adhesive bonding. A further-preferred use is their use as dielectrics in electronic components, especially as dielectrics for filling trenches, the trenches having an aspect ratio (ratio of feature height to feature width) of more than 4, with the width of the trenches being only 100 nm or less. When used as adhesives, the polybenzoxazole cyanates of the present invention can in principle be used by the following general method:

a. the polybenzoxazole cyanates of the general formula (I) are applied to the faces of the materials or components to be bonded;
b. the faces to be bonded are brought into contact with one another;
c. the polybenzoxazole cyanates are crosslinked to polybenzoxazole cyanurates.

The crosslinking of the polybenzoxazole cyanates takes place preferably under the action of temperature, that may also take place by means of laser treatment, ultrasound or microwave treatment.

When used as dielectrics, the polybenzoxazole cyanates of the present invention are applied to the substrate to be coated and then crosslinked to polybenzoxazole cyanurates. Thermal crosslinking takes place preferably at a temperature of 200° C.–400° C., more preferably 250–350° C.

Application to the particular substrate, both in the context of adhesive bonding and in the context of function as a dielectric, takes place preferably by applying the polybenzoxazole cyanates in the form of a powder to the face(s) and converting the powder, by heating, into a melt, which can be distributed over the surface, by spreading or brushing, for example.

In a further preferred embodiment, the polybenzoxazole cyanates of the present invention can be applied in a melt or in solution in an organic solvent to the area to be bonded or to be coated, this application taking place by means of spin coating, spraying or spreading or brushing. In this case of solventborne systems, drying is advantageous and in many cases is also necessary. After crosslinking, the polymers of the present invention have a high temperature stability, evident in a thermogravimetric analysis >450° C.

It being a particular advantage of the present invention that no cleavage products are formed or liberated in the course of crosslinking. As a result, the products are particularly suitable for filling very narrow trenches, especially those having an aspect ratio >4 and trench widths of 100 nm or less.

The polymers of the invention are stable toward process chemicals, such as solvents, strippers, bases, acids or aggressive gases.

A further particular advantage of the materials is the very high bond strength to different surfaces, such as aluminum, titanium, vanadium, chromium, manganese, iron, cobalt, nickel, copper, zinc, steel, brass, palladium, silver, tin, tantalum, tungsten, platinum, gold, lead, carbon, including plasma-deposited carbon-containing layers, carbon fibers, silicon or germanium, for example. The polybenzoxazole cyanurates of the invention can therefore be used with preference for the adhesive bonding, for the filling of narrow trenches or features and/or for the coating of these materials.

Further-preferred materials for coating, for the filling of trenches or features or for adhesive bonding are alloys of the abovementioned material or compounds of the abovementioned materials with oxygen and/or nitrogen, especially silicon carbide, silicon nitride, silicon oxide, titanium nitride, tantalum nitride, silicon oxynitride, tungsten nitride, gallium arsenide, gallium nitride, gallium indium phosphite, indium-tin oxide. In principle, the invention further envisages as being preferred for adhesive bonding those compounds which are employed in microelectronics and optoelectronics, especially chips and/or wafers.

Materials which are further suitable in accordance with the invention for adhesive bonding or coating are ceramics, glass ceramics, glasses, clayware, porcelain, stoneware and/or silicates. For glasses it is possible with preference to use quartz, soda, potassium, soda-potassium-lime, boron-alumina, borosilicate, and potassium lead glasses. Enamel as well can be bonded in accordance with the invention. Moreover, various minerals, such as marble, basalt, limestone, granite, and concrete can be coated and/or bonded with preference in accordance with the invention.

In the case of adhesive bonding, all of the abovementioned materials can be bonded to themselves or to other of the abovementioned materials.

In the text below the present invention is illustrated with reference to examples, which are not intended to restrict the scope of the invention.

BRIEF DESCRIPTION OF THE DRAWINGS

In the description, reference is made to the following figures:

FIG. 2: FIG. 2a shows diagrammatically the sample setup for measuring the dielectric constant of substrates coated with the polybenzoxazole cyanates of the invention. FIG. 2b shows the shadowmask used to deposit Ti pads (Ti islands or Ti electrodes).

DEFINITIONS

Figure 1:
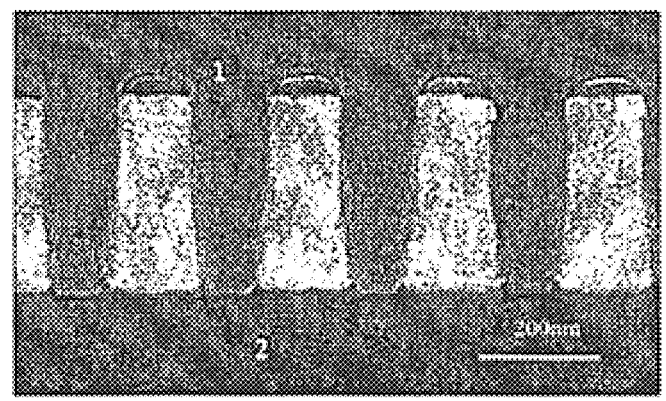
FIG. 1: shows a typical scanning electron micrograph of Al structures filled with polybenzoxazole cyanurates of the present invention.

In the context of the present invention, the following definitions apply:

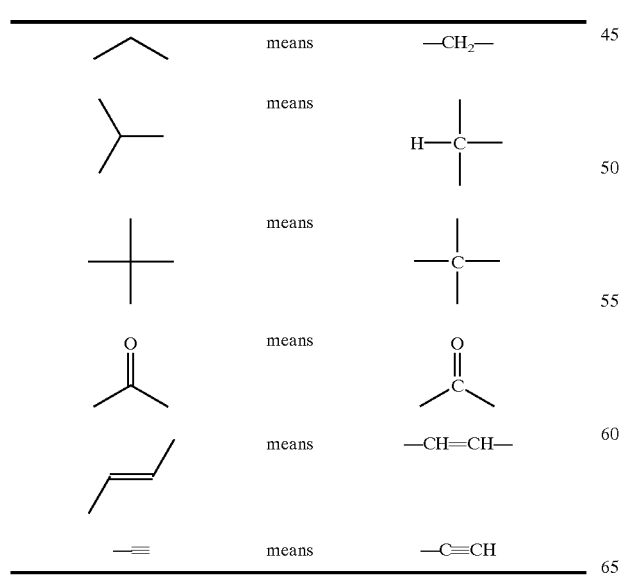

This applies to cyclic, branched, and linear compounds.

EXAMPLES

Chemicals Used

Bisaminophenols:

9,9'-bis(4-((3-hydroxy-4-amino)phenyloxy)phenyl)fluorene—(bisaminophenol 1)

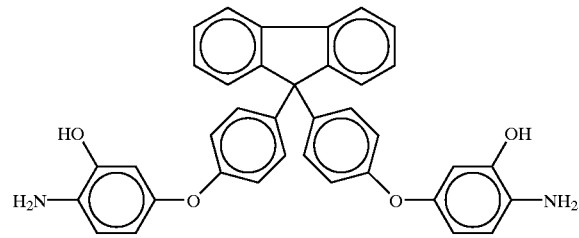

2,2-bis(3-amino-4-hydroxyphenyl)hexafluoropropane—(bisaminophenol 2)

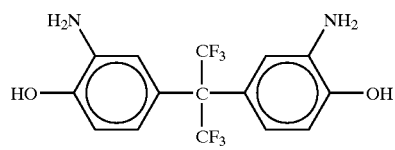

3,3'-diamino-4-dihydroxybiphenyl)—(bisaminophenol 3)

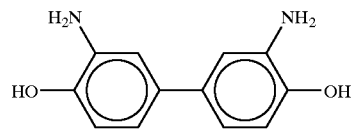

2,2-bis(3-amino-4-hydroxyphenyl) sulfone—(bisaminophenol 4)

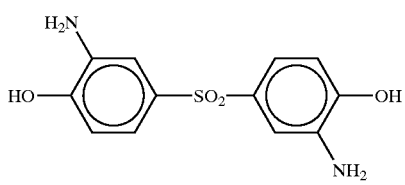

Dicarboxylic Acid:

diphenyl ether 4,4'-dicarboxylic acid—(dicarboxylic acid 1)

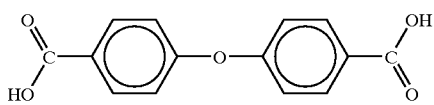

diphenyl sulfone 4,4'-dicarboxylic acid—(dicarboxylic acid 2)

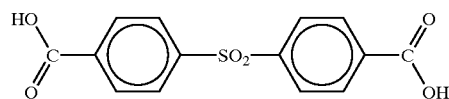

pyridine-2,6-dicarboxylic acid—(dicarboxylic acid 3)

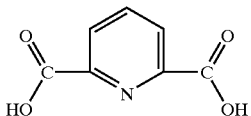

isophthalic acid—(dicarboxylic acid 4)

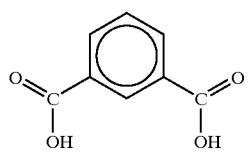

biphenyl-4,4'-dicarboxylic acid—(dicarboxylic acid 5)

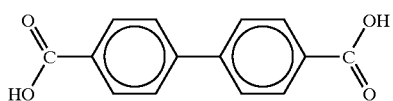

1,3-bis(3-carboxypropyl)tetramethyldisiloxane— (dicarboxylic acid 6)

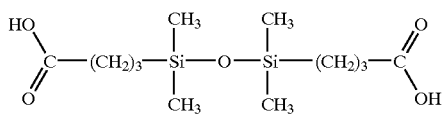

Endcap:

4-acetoxybenzoic acid—(endcap 1)

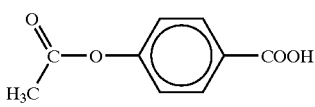

6-acetoxy-2-naphthoic acid—(endcap 2)

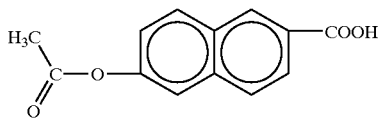

4'-acetoxybiphenyl-4-carboxylic acid—(endcap 3)

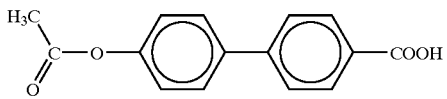

Eaton's reagent: solution of 7.5% by weight phosphorus (V) oxide in methanesulfonic acid All polymer syntheses are conducted under dry nitrogen as inert gas.

Example 1

Polybenzoxazole Cyanate 1

16.94 g (0.03 mol) of bisaminophenol 1 are dissolved in 600 ml of Eaton's reagent. The apparatus is inert-gassed with argon. All subsequent steps are likewise conducted under an inert atmosphere. To this solution [sic] 1.05 g (0.005 mol) of 1,3,5-benzenetricarboxylic acid in solution in 100 ml of Eaton's reagent are slowly introduced dropwise into the reaction solution with stirring at room temperature. The combined solutions are heated at 80° C. with stirring for 2 hours.

To this solution there is added dropwise at room temperature a solution of 3.87 g (0.015 mol) of dicarboxylic acid 1 in 60 ml of Eaton's reagent. The combined solutions are heated at 80° C. with stirring for 5 hours. 2.7 g (0.015 mol) of endcap 1 in solution in 40 ml of Eaton's reagent are added dropwise to the reaction mixture of 40° C. The mixture is then heated at 100° C. with stirring for 6 hours.

In order to isolate the polymer, the reaction mixture is filtered through a glass frit and the filtrate is introduced dropwise with stirring and ice cooling into a mixture of 2 l of deionized (DI) water, 2 kg of ice and 250 ml of concentrated ammonia, with further concentrated ammonia being added during dropwise introduction so that the pH does not fall below 8. In the course of the dropwise introduction the temperature must not rise above 30° C. The precipitated polymer is filtered off with suction and washed with 1 l of cold DI water. After the suction filtration, the polymer is stirred once in 2 l of a 3% strength ammonia solution at room temperature for 1 hour and then filtered off with suction. The polymer is washed to neutrality by suspending it a number of times in DI water, filtered off and dried at 50° C./10 mbar for 72 hours.

The dried polymer in 300 ml of dimethylformamide and 30 ml of concentrated ammonia is heated at 90° with stirring for 1 hour. The polymer is precipitated by introducing the reaction solution dropwise with ice cooling into 2 l of 3% strength formic acid, in the course of which the temperature ought not to rise above 30° C. The pH is to be adjusted to 6 by further addition of formic acid. The precipitated polymer is filtered off with suction and washed with 1 l of cold DI water. The polymer is washed to neutrality by suspending it a number of times in DI water, filtered off and dried at 50° C./10 mbar for 72 hours.

15 g of the dried polymer are dissolved in 600 ml of γ-butyrolactone, and 3.18 g (0.03 mol) of cyanogen bromide are added at 10° C. with stirring. 3.04 g (0.03 mol) of triethylamine are slowly added dropwise with stirring and ice cooling at from 0° C. to 5° C. The mixture is stirred at 20° C. for 5 hours.

In order to isolate the polybenzoxazole cyanate the reaction mixture is filtered through a glass frit and the filtrate is introduced dropwise with stirring and ice cooling into 1 l of DI water, with a further 1 l of DI water being added in the course of dropwise introduction. The precipitated polymer is filtered off with suction and washed with 2 l of cold DI water. The polybenzoxazole cyanate is subsequently dried at max. 40° C. and 10 mbar for 96 hours.

The polybenzoxazole cyanate prepared in this way is soluble in solvents such as NMP, γ-butyrolactone, ethyl lactate, and diethylene glycol monomethyl ether.

Example 2

Polybenzoxazole Cyanate 2

Implementation the same as in example 1 but using 1.05 g (0.005 mol) of 1,3,5-benzenetricarboxylic acid, 10.99 g (0.03 mol) of bisaminophenol 2, 3.87 g (0.015 mol) of dicarboxylic acid 1 and 2.7 g (0.015 mol) of endcap 1.

Example 3

Polybenzoxazole Cyanate 3

Implementation the same as in example 1 but using 1.05 g (0.005 mol) of 1,3,5-benzenetricarboxylic acid, 10.99 g (0.03 mol) of bisaminophenol 2, 4.59 g (0.015 mol) of dicarboxylic acid 2 and 3.45 g (0.015 mol) of endcap 2.

Example 4

Polybenzoxazole Cyanate 4

Implementation the same as in example 1 but using 1.05 g (0.005 mol) of 1,3,5-benzenetricarboxylic acid, 6.49 g (0.03 mol) of bisaminophenol 2 [sic], 2.5 g (0.015 mol) of dicarboxylic acid 3 and 3.84 g (0.015 mol) of endcap 3.

Example 5

Polybenzoxazole Cyanate 5

Implementation the same as in example 1 but using 1.05 g (0.005 mol) of 1,3,5-benzenetricarboxylic acid, 8.4 g (0.03 mol) of bisaminophenol 4, 2.49 g (0.015 mol) of dicarboxylic acid 4 and 2.7 g (0.015 mol) of endcap 1.

Example 6

Polybenzoxazole Cyanate 6

Implementation the same as in example 1 but using 1.05 g (0.005 mol) of 1,3,5-benzenetricarboxylic acid, 10.99 g (0.03 mol) of bisaminophenol 2, 3.63 g (0.015 mol) of dicarboxylic acid 5 and 2.7 g (0.015 mol) of endcap 1.

Example 7

Polybenzoxazole Cyanate 7

Implementation the same as in example 1 but using 1.05 g (0.005 mol) of 1,3,5-benzenetricarboxylic acid, 16.94 g (0.03 mol) of bisaminophenol 1, 4.59 g (0.015 mol) of dicarboxylic acid 6 and 3.45 g (0.015 mol) of endcap 2.

Example 8

Polybenzoxazole Cyanate 8

Implementation the same as in example 1 but using 1.05 g (0.005 mol) of 1,3,5-benzenetricarboxylic acid, 10.99 g (0.03 mol) of bisaminophenol 2, 4.59 g (0.015 mol) of dicarboxylic acid 6 and 3.84 g (0.015 mol) of endcap 3.

Example 9

Polybenzoxazole Cyanate 9

Implementation the same as in example 1 but using 2.1 g (0.01 mol) of 1,3,5-benzenetricarboxylic acid, 10.98 g (0.03 mol) of bisaminophenol 2 and 6.9 g (0.03 mol) of endcap 2.

Example 10

Polybenzoxazole Cyanate 10

Implementation the same as in example 1 but using 1.05 g (0.005 mol) of 1,3,5-benzenetricarboxylic acid, 33.85 g (0.06 mol) of bisaminophenol 1, 3.87 g (0.015 mol) of dicarboxylic acid 1 with 4.59 g (0.015 mol) of dicarboxylic acid 2 and 2.7 g (0.015 mol) of endcap 1.

Example 11

Polybenzoxazole Cyanate 11

Implementation the same as in example 1 but using 1.05 g (0.005 mol) of 1,3,5-benzenetricarboxylic acid, 14.64 g (0.04 mol) of bisaminophenol 2 with 5.6 g (0.02 mol) of bisaminophenol 4, 7.74 g (0.03 mol) of dicarboxylic acid 1 and 3.45 g (0.015 mol) of endcap 2.

Example 12

Polybenzoxazole Cyanate 12

Implementation the same as in example 1 but using 1.05 g (0.005 mol) of 1,3,5-benzenetricarboxylic acid, 7.32 g (0.02 mol) of bisaminophenol 2 with 2.8 g (0.01 mol) of bisaminophenol 4, 3.06 g (0.01 mol) of dicarboxylic acid 2 with 1.53 g (0.005 mol) of dicarboxylic acid 6 and 3.84 g (0.015 mol) of endcap 3.

Example 13

Polybenzoxazole 13 (Example for a=0 and b=0)

Implementation the same as in example 1 but using 2.1 g (0.01 mol) of 1,3,5-benzenetricarboxylic acid, 10.98 g (0.03 mol) of bisaminophenol 2 and 7.68 g (0.03 mol) of endcap 3.

Example 14

Determination of the Thermal Stabilities

The polybenzoxazole cyanates prepared exhibit thermal stabilities of >400° C. according to TGA investigations (instrument: STA 1500 from Rheometric Scientific, heating rate: 5 K/min, inert gas: argon). The isothermal mass loss per hour at 400° C. for 10 hours is <1.5%.

Accordingly, the polybenzoxazole cyanurates [sic] prepared meet the requirements for the intended applications.

Example 15

Preparation of Polymer Solutions 10 g of the polybenzoxazole cyanates prepared in examples 1 to 13 are dissolved in 40 g of distilled NMP (VLSI-Selectipur®). The dissolution process is advantageously carried out on a shaker apparatus at room temperature. The solution is then filtered under pressure through a 0.2 μm filter into a cleaned, particle-free, glass sample vessel. The viscosity of the polymer solution can be modified by varying the mass of polybenzoxazole cyanate dissolved.

Example 16

Preparation of Polymer Solutions with Addition of Crosslinker

By using additional crosslinkers it is possible to exert a positive influence on the cure behavior, the adhesive properties, the strength, and the thermal and chemical stability of the polybenzoxazole cyanates. Crosslinkers which can be used here include short-chain compounds containing at least two cyanate groups (see structural formulae below). These crosslinkers can be added to the polymer solution at from 0.1 to 15% by weight, based on the polybenzoxazole cyanate.

Examples for crosslinking compounds:
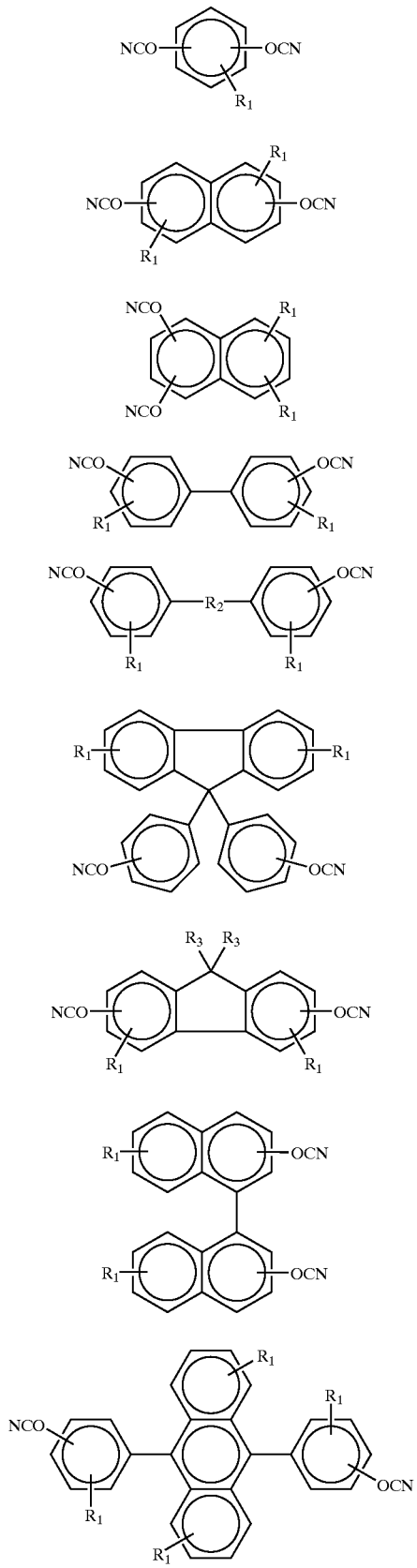
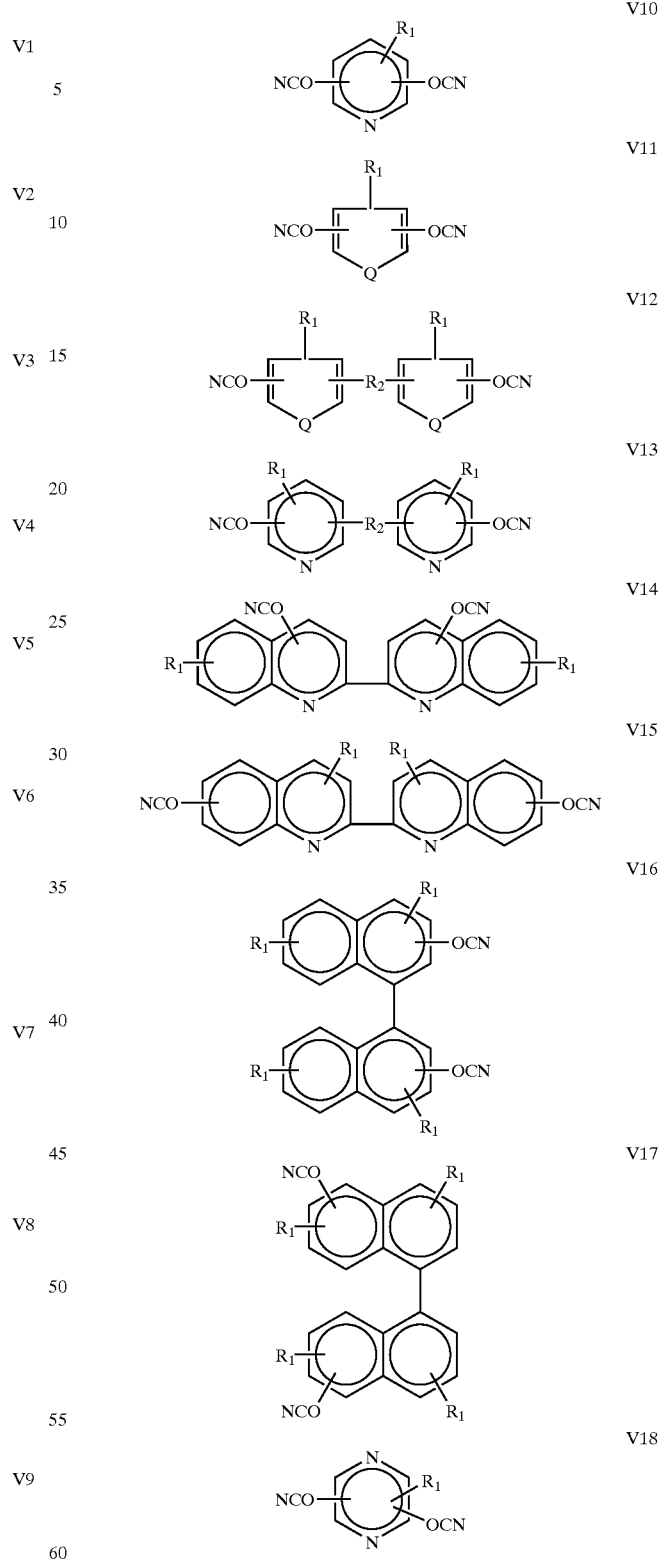
$R_1$ to $R_3$ and Q are as defined above.
10 g of the polybenzoxazole cyanates prepared in examples 1 to 13 and 1 g of crosslinker are dissolved in 40 g of distilled NMP (VLSI-Selectipur®). The dissolution procedure is advantageously carried out on a shaker apparatus at room temperature. The solution is then filtered under pressure through a 0.2 μm filter into a cleaned, particle-free, glass sample vessel. The viscosity of the polymer solution can be modified by varying the mass of polybenzoxazole cyanate dissolved.

Example 17

Preparation of Adhesion Promoter Solutions

By using adhesion promoters it is possible to enhance the wetting of the surface to be bonded and hence the adhesion of the polybenzoxazole cyanates to the surfaces relevant in microelectronics, such as silicon, silicon oxide, silicon nitride, tantalum nitride, glass or quartz, for example. Examples of adhesion promoters which can be used include the following compounds:

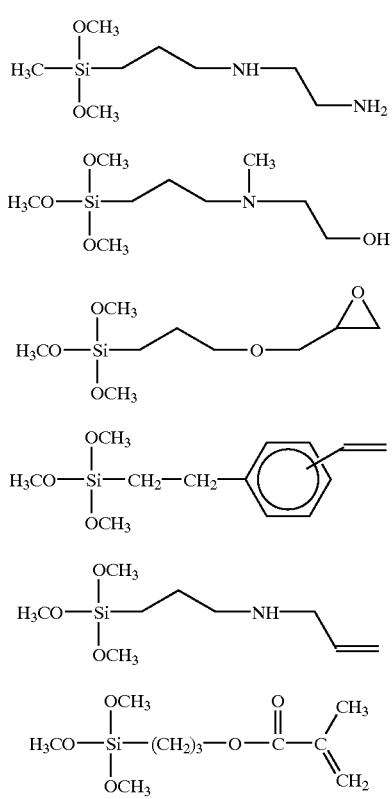

0.5 g of adhesion promoter (e.g. N-(2-aminoethyl)-3-amino-propylmethyldimethoxysilane) are dissolved at room temperature in 95 g of methanol, ethanol or isopropanol (VLSI-Selectipur®) and 5 g of DI water in a cleaned, particle-free, glass sample vessel. After standing for 24 hours at room temperature, the adhesion promoter solution is ready for use. This solution can be used for a maximum of 3 weeks.

Example 18

Improvement to the Adhesion by Roughening of the Surface to be Bonded

In order to remove oxide layers in the case of metals and/or to roughen the surface it is advantageous to carry out a mechanical sanding process, brushing or sandblasting. The surfaces to be bonded are therefore treated with an abrasive. The removal of dust residues can be done by blowing with compressed air or washing in water.

Example 19

Cleaning of the Surfaces to be Bonded

In order to remove residues of oil and fat or other impurities, the components to be bonded can be treated with solvents such as acetone, alcohols, halogenated hydrocarbons or aromatic hydrocarbons. The component can be cleaned by rubbing with lint-free materials, immersing it in the solvent at room temperature or elevated temperature, or in an ultrasound bath.

Cleaning may also be carried out by means of plasma or flaming. In that case the component to be bonded is held for a short period of about 1 minute in a plasma flow or in a flame.

Example 20

Application of the Adhesion Promoter

The adhesion promoter should result in a monomolecular layer on the surface of the parts to be bonded. The adhesion promoter may advantageously be applied by spin coating. For this purpose the adhesion promoter solution from example 16 is applied to the area to be bonded through a 0.2 μm preliminary filter, followed by spin coating at 5000 rpm for 30 seconds. This is followed by a drying step at 100° C. for 60 seconds. Another way of applying the adhesion promoter is to immerse the area to be bonded into the adhesion promoter solution and then to blow the area dry. The areas thus treated should be bonded within 2 hours.

Example 21

Application of the Adhesive as a Solution by Spin Coating

The adhesive solution prepared in example 15 or 16 is applied by syringe to the surface which is to be bonded and which has been pretreated in accordance with examples 18 and 19, and possibly also in accordance with example 20, and is uniformly distributed using a spin coater. The rotational speed of the spin coater determines the thickness of the film of adhesive. Customary conditions are 1000 rpm to 3500 rpm for 30 seconds. This is followed, for the purpose of removing the solvent, by a drying step at 120° C. and 100 mbar for 10 minutes in an oven.

Example 22

Application of the Adhesive as a Solution by Spraying

The adhesive solution prepared in example 15 or 16 is applied uniformly by spraying apparatus (e.g., spray gun) to the surface which is to be bonded and which has been pretreated in accordance with examples 18 and 19, and possibly also in accordance with example 20. This is followed, for the purpose of removing the solvent, by a drying step at 120° C. and 100 mbar for 10 minutes in an oven.

Example 23

Application of the Adhesive as a Solution by Brushing

The adhesive solution prepared in example 15 or 16 is applied uniformly by brushing to the surface that is to be bonded. The brush should be of a material which cannot be attacked by NMP. Subsequently, for the purpose of removing the solvent, a drying step is carried out at 120° C. and 100 mbar for 10 minutes in an oven.

Example 24

Adhesive Bonding

The components prepared in accordance with examples 21, 22 or 23 are pressed on a hotplate at 5 N/cm², heated to a temperature of 300° C. and held at this temperature for 20 minutes.

| Temperature range generally | 250° C. to 350° C. |
|---|---|
| Range for bonding time | 0.5 to 20 min |
| Range for pressing force | 0.5 to 20 N/cm² |

This may be followed optionally by a baking step from 300° C. to 420° C. for 1 hour in an oven.

Example 25

Adhesive Bonding of Titanium Nitride and Determination of the Adhesion

A 4" (10.25 cm diameter) silicon wafer cleaned in accordance with example 19 is sputter-coated with a titanium nitride coat 50 nm thick. The polybenzoxazole cyanate adhesive solution prepared in accordance with example 15 is applied to this wafer by spin coating at 500 rpm for 5 seconds and at 3500 rpm for 25 seconds. After a short softbake at 80° C. for 1 minute and drying at 120° C. and 100 mbar for 10 minutes in an oven, 10 silicon chips measuring 4×4 mm², likewise cleaned beforehand in accordance with example 18 and sputter-coated on the surface with 50 nm titanium nitride, are pressed onto the polybenzoxazole cyanate film at room temperature with a force of 5 N/cm². The bonded parts are then heated in an oven at 3 K/min to 300° C. under an applied pressure of 5 N/cm², the temperature being maintained at 300° C. for 20 minutes in order to effect conversion to polybenzoxazole cyanurates. This is followed by cooling to room temperature at 5 K/min. After cooling to room temperature, an adhesion test is carried out by means of a shear tester, Dage series 400. The listing below shows the polymer used in the first column.

Column 2 shows the shear force found.
Column 3 shows surface treatment of the components to be bonded (L=solvent; M=mechanical abrasion; B=flaming; PL=plasma).
Column 4 shows whether and, if so, which adhesion promoter was used.
Column 5 shows the type of bonding (S=spin coating; T=immersing; P=brushing; SP=spraying).
Column 6 shows whether and, if so, which crosslinker was added.

Average Shear Force Found:

| polybenzoxazole cyanate 1 | 18.13 N/mm² | L | — | S | V1 |
|---|---|---|---|---|---|
| polybenzoxazole cyanate 2 | 20.35 N/mm² | L | HV1 | SP | — |
| polybenzoxazole cyanate 3 | 23.51 N/mm² | PL | HV2 | S | V1 |
| poiybenzoxazole cyanate 4 | 20.06 N/mm² | L | HV1 | S | V2 |

Example 26

Adhesive Bonding of Tantalum Nitride and Determination of the Adhesion

Experiment carried out in exactly the same way as for titanium nitride (example 25) except that here the surface of the wafer and of the chips was composed not of titanium nitride but of tantalum nitride.
Average Shear Force Found:

| polybenzoxazole cyanate 5 | 17.99 N/mm² | L | — | S | — |
|---|---|---|---|---|---|
| polybenzoxazole cyanate 6 | 20.52 N/mm² | L | HV2 | P | V3 |
| polybenzoxazole cyanate 7 | 20.71 N/mm² | PL | HV3 | T | V4 |
| polybenzoxazole cyanate 8 | 19.44 N/mm² | L | HV1 | S | — |

Example 27

Adhesive Bonding of Silicon and Determination of the Adhesion

Experiment carried out in exactly the same way as for titanium nitride (example 25) except that here the surface of the wafer and of the chips was composed not of titanium nitride but of silicon.
Average Shear Force Found:

| polybenzoxazole cyanate 9 | 20.23 N/mm² | L | HV4 | S | V3 |
|---|---|---|---|---|---|
| polybenzoxazole cyanate 10 | 20.12 N/mm² | L | HV5 | P | V6 |
| polybenzoxazole cyanate 11 | 18.95 N/mm² | PL | — | S | V1 |
| polybenzoxazole cyanate 12 | 18.59 N/mm² | PL | HV1 | SP | — |

Example 28

Adhesive Bonding of Glass and Determination of the Adhesion

Experiment carried out in exactly the same way as example 25 except that here a glass wafer and 4×4 mm glass chips were used.
Average Shear Force Found:

| polybenzoxazole cyanate 1 | 18.51 N/mm² | L | HV3 | T | V1 |
|---|---|---|---|---|---|
| polybenzoxazole cyanate 2 | 19.55 N/mm² | L | HV2 | SP | V10 |
| polybenzoxazole cyanate 3 | 18.76 N/mm² | L | HV1 | S | V3 |
| polybenzoxazole cyanate 4 | 17.83 N/mm² | L | HV1 | S | — |

Example 29

Adhesive Bonding of Quartz Glass and Determination of the Adhesion

Experiment carried out in exactly the same way as example 25 except that here a quartz wafer and 4×4 mm quartz chips were used.
Average Shear Force Found:

| polybenzoxazole cyanate 5 | 16.94 N/mm² | L | HV3 | S | — |
|---|---|---|---|---|---|
| polybenzoxazole cyanate 6 | 17.52 N/mm² | PL | — | S | V4 |
| polybenzoxazole cyanate 7 | 17.79 N/mm² | L | HV1 | S | V2 |
| polybenzoxazole cyanate 8 | 18.67 N/mm² | L | HV2 | S | V5 |

Example 30

Adhesive Bonding of Copper and Determination of the Adhesion

Experiment carried out in exactly the same way as example 25 except that here copper plates and 4×4 mm copper chips were used.

Average Shear Force Found:

| | | | | | |
|---|---|---|---|---|---|
| polybenzoxazole cyanate 9 | 20.40 N/mm² | L | HV1 | S | V1 |
| polybenzoxazole cyanate 10 | 19.43 N/mm² | M | HV2 | T | — |
| polybenzoxazole cyanate 11 | 19.85 N/mm² | B | — | P | V2 |
| polybenzoxazole cyanate 13 | 20.10 N/mm² | M | HV3 | S | V3 |

Example 31

Adhesive Bonding of Brass and Determination of the Adhesion

Experiment carried out in exactly the same way as example 25 except that here brass plates and 4×4 mm brass chips were used.

Average Shear Force Found:

| | | | | | |
|---|---|---|---|---|---|
| polybenzoxazole cyanate 1 | 21.06 N/mm² | M | HV1 | S | V1 |
| polybenzoxazole cyanate 2 | 20.31 N/mm² | M | — | Sp | V4 |
| polybenzoxazole cyanate 3 | 19.44 N/mm² | B | HV2 | T | V10 |
| polybenzoxazole cyanate 4 | 20.29 N/mm² | L | HV4 | P | — |

Example 32

Adhesive Bonding of Steel and Determination of the Adhesion

Experiment carried out in exactly the same way as example 25 except that here steel plates and 4×4 mm steel chips were used.

Average Shear Force Found:

| | | | | | |
|---|---|---|---|---|---|
| polybenzoxazole cyanate 5 | 19.16 N/mm² | L | HV1 | S | — |
| polybenzoxazole cyanate 6 | 18.89 N/mm² | L | — | S | V3 |
| polybenzoxazole cyanate 7 | 19.70 N/mm² | M | HV3 | P | — |
| polybenzoxazole cyanate 8 | 19.41 N/mm² | M | HV4 | P | V2 |

Example 33

Adhesive Bonding of Aluminum and Determination of the Adhesion

Experiment carried out in exactly the same way as example 25 except that here aluminum plates and 4×4 mm aluminum chips were used.

Average Shear Force Found:

| | | | | | |
|---|---|---|---|---|---|
| polybenzoxazole cyanate 9 | 19.42 N/mm² | L | — | S | V1 |
| polybenzoxazole cyanate 10 | 18.06 N/mm² | M | HV1 | S | V2 |
| polybenzoxazole cyanate 11 | 19.22 N/mm² | L | HV3 | P | — |
| polybenzoxazole cyanate 12 | 20.69 N/mm² | M | HV6 | P | V6 |

Example 34

Adhesive Bonding of Ceramic and Determination of the Adhesion

Experiment carried out in exactly the same way as example 25 except that here ceramic plates and 4×4 mm ceramic chips were used.

Average Shear Force Found:

| | | | | | |
|---|---|---|---|---|---|
| polybenzoxazole cyanate 1 | 19.54 N/mm² | B | HV2 | T | V3 |
| polybenzoxazole cyanate 2 | 20.64 N/mm² | L | HV4 | SP | V1 |
| polybenzoxazole cyanate 3 | 18.88 N/mm² | L | HV5 | S | — |
| polybenzoxazole cyanate 4 | 19.60 N/mm² | B | — | T | — |

Example 35

Adhesive Bonding of Marble and Determination of the Adhesion

Experiment carried out in exactly the same way as example 25 except that here marble plates and 4×4 mm marble pieces were used.

Average Shear Force Found:

| | | | | | |
|---|---|---|---|---|---|
| polybenzoxazole cyanate 5 | 20.36 N/mm² | M | HV2 | P | V1 |
| polybenzoxazole cyanate 6 | 21.21 N/mm² | B | — | P | — |
| polybenzoxazole cyanate 7 | 20.82 N/mm² | M | HV3 | Sp | — |
| polybenzoxazole cyanate 8 | 20.35 N/mm² | M | — | Sp | V3 |

Example 36

Adhesive Bonding of Granite and Determination of the Adhesion

Experiment carried out in exactly the same way as example 25 except that here granite and 4×4 mm granite pieces were used.

Average Shear Force Found:

| | | | | | |
|---|---|---|---|---|---|
| polybenzoxazole cyanate 9 | 20.21 N/mm² | B | HV1 | T | V3 |
| polybenzoxazole cyanate 10 | 19.74 N/mm² | B | HV4 | T | V1 |
| polybenzoxazole cyanate 12 | 19.29 N/mm² | M | — | P | V2 |
| polybenzoxazole cyanate 13 | 18.21 N/mm² | L | HV2 | Sp | — |

Example 37

Adhesive Bonding of Silicon Carbide and Determination of the Adhesion

Experiment carried out in exactly the same way as example 25 except that here silicon carbide wafers and 4×4 mm silicon carbide chips were used.

Average Shear Force Found:

| | | | | | |
|---|---|---|---|---|---|
| polybenzoxazole cyanate 1 | 17.95 N/mm² | L | HV1 | S | V1 |
| polybenzoxazole cyanate 2 | 18.38 N/mm² | L | HV3 | S | — |
| polybenzoxazole cyanate 3 | 17.26 N/mm² | L | — | S | V6 |
| polybenzoxazole cyanate 4 | 19.15 N/mm² | L | — | S | V3 |

Example 38

Adhesive Bonding of Silicon with Copper and Determination of the Adhesion

Experiment carried out in exactly the same way as example 25 except that here silicon wafers and 4×4 mm copper pieces were used.

Average Shear Force Found:

| | | | | | |
|---|---|---|---|---|---|
| polybenzoxazole cyanate 5 | 18.73 N/mm$^2$ | L | HV1 | S | V3 |
| polybenzoxazole cyanate 6 | 19.40 N/mm$^2$ | B | HV1 | S | — |
| polybenzoxazole cyanate 7 | 17.07 N/mm$^2$ | B | HV2 | P | V2 |
| polybenzoxazole cyanate 8 | 17.55 N/mm$^2$ | L | HV2 | S | — |

Example 39

Adhesive Bonding of Silicon with Ceramic and Determination of the Adhesion

Experiment carried out in exactly the same way as example 25 except that here silicon wafers and 4×4 mm ceramic chips were used.
Average Shear Force Found:

| | | | | | |
|---|---|---|---|---|---|
| polybenzoxazole cyanate 9 | 18.11 N/mm$^2$ | L | HV1 | S | — |
| polybenzoxazole cyanate 10 | 18.48 N/mm$^2$ | L | HV1 | S | V4 |
| polybenzoxazole cyanate 11 | 18.35 N/mm$^2$ | L | HV3 | S | — |
| polybenzoxazole cyanate 12 | 17.91 N/mm$^2$ | L | — | T | V4 |

Example 40

Adhesive Bonding of Silicon with Glass and Determination of the Adhesion

Experiment carried out in exactly the same way as example 25 except that here silicon wafers and 4×4 mm glass chips were used.
Average Shear Force Found:

| | | | | | |
|---|---|---|---|---|---|
| polybenzoxazole cyanate 1 | 19.02 N/mm$^2$ | L | HV3 | S | V5 |
| polybenzoxazole cyanate 2 | 19.85 N/mm$^2$ | L | HV6 | S | — |
| polybenzoxazole cyanate 3 | 18.30 N/mm$^2$ | L | HV4 | S | V2 |
| polybenzoxazole cyanate 4 | 17.23 N/mm$^2$ | L | — | S | V1 |

Example 41

Adhesive Bonding of Aluminum with Glass and Determination of the Adhesion

Experiment carried out in exactly the same way as example 25 except that here aluminum wafers and 4×4 mm glass chips were used.
Average Shear Force Found:

| | | | | | |
|---|---|---|---|---|---|
| polybenzoxazole cyanate 5 | 16.96 N/mm$^2$ | L | — | S | — |
| polybenzoxazole cyanate 6 | 17.52 N/mm$^2$ | L | HV1 | P | V4 |
| polybenzoxazole cyanate 7 | 16.72 N/mm$^2$ | L | — | Sp | V10 |
| polybenzoxazole cyanate 8 | 18.16 N/mm$^2$ | L | HV1 | S | — |

Example 42

Adhesive Bonding of Steel with Glass and Determination of the Adhesion

Experiment carried out in exactly the same way as example 25 except that here steel plates and 4×4 mm glass chips were used.
Average Shear Force Found:

| | | | | | |
|---|---|---|---|---|---|
| polybenzoxazole cyanate 9 | 16.51 N/mm$^2$ | L | HV2 | S | V1 |
| polybenzoxazole cyanate 10 | 16.83 N/mm$^2$ | L | — | T | V3 |
| polybenzoxazole cyanate 11 | 17.48 N/mm$^2$ | L | HV3 | S | V3 |
| polybenzoxazole cyanate 12 | 17.17 N/mm$^2$ | L | HV4 | S | V6 |

Example 43

Adhesive Bonding of Granite with Glass and Determination of the Adhesion

Experiment carried out in exactly the same way as example 25 except that here granite and 4×4 mm glass chips were used.
Average Shear Force Found:

| | | | | | |
|---|---|---|---|---|---|
| polybenzoxazole cyanate 1 | 16.72 N/mm$^2$ | B | — | T | V3 |
| polybenzoxazole cyanate 2 | 17.13 N/mm$^2$ | L | HV3 | P | — |
| polybenzoxazole cyanate 3 | 16.31 N/mm$^2$ | L | HV1 | P | V2 |
| polybenzoxazole cyanate 4 | 17.83 N/mm$^2$ | B | HV6 | S | V1 |

Example 44

Adhesive Bonding of Copper with Aluminum and Determination of the Adhesion

Experiment carried out in exactly the same way as example 25 except that here copper plates and 4×4 mm aluminum pieces were used.
Average Shear Force Found:

| | | | | | |
|---|---|---|---|---|---|
| polybenzoxazole cyanate 5 | 18.53 N/mm$^2$ | M | HV1 | P | — |
| polybenzoxazole cyanate 6 | 19.61 N/mm$^2$ | M | HV3 | Sp | V10 |
| polybenzoxazole cyanate 7 | 20.38 N/mm$^2$ | M | HV4 | T | V3 |
| polybenzoxazole cyanate 8 | 19.19 N/mm$^2$ | M | — | P | V1 |

Example 45

Comparative Example, Polyimide Adhesion

The polyimide PIMEL G-7636C from Asahi Kasei was dissolved in NMP as in example 15 and bonded in accordance with example 25. The following average adhesion values were found using the Dage series 4000 shear tester:

| | |
|---|---|
| titanium nitride surface | 13.26 N/mm$^2$ |
| tantalum nitride surface | 14.61 N/mm$^2$ |
| silicon surface | 14.31 N/mm$^2$ |
| glass surface | 12.18 N/mm$^2$ |
| copper surface | 13.52 N/mm$^2$ |
| steel surface | 10.38 N/mm$^2$ |
| ceramic surface | 13.03 N/mm$^2$ |

Example 46

Comparative Example, Polycyanurate Adhesion

A polycyanurate based on dicyanatobisphenol A, which is representative of DE 44 32 965 C1, was dissolved in NMP as in example 15 and bonded in accordance with example 25. The following average adhesion values were found using the Dage series 4000 shear tester:

| | |
|---|---|
| titanium nitride surface | 10.13 N/mm$^2$ |
| tantalum nitride surface | 11.46 N/mm$^2$ |
| silicon surface | 12.11 N/mm$^2$ |
| glass surface | 12.01 N/mm$^2$ |
| copper surface | 13.72 N/mm$^2$ |
| steel surface | 13.37 N/mm$^2$ |
| ceramic surface | 12.44 N/mm$^2$ |

Example 47

Determination of the Stability Toward Organic Solvents

The bonds produced in accordance with examples 25 to 44 were heated in acetone at 40° C. for 3 hours, in chloroform at 40° C. for 3 hours, in toluene at 60° C. for 3 hours, and in NMP at 80° C. for 3 hours. The wafer was then washed with DI water. The wafer was dried at 200° C. in vacuo for 60 minutes and the adhesion was determined using the Dage series 4000 shear tester. The adhered examples 32 to 50 [sic] showed no signs of detachment. After this test, the bond strength remained unchanged.

| | | |
|---|---|---|
| Comparative example 45 | 5.78 N/mm$^2$ | (glass surface) |
| Comparative example 46 | 8.94 N/mm$^2$ | (glass surface) |

Example 48

Determination of the Stability Toward Acids

The components produced in accordance with examples 25 to 30, 36, 39, 41, and 42 were stored in concentrated hydrochloric acid at room temperature (25° C.) for 5 hours and in 50% strength sulfuric acid at 60° C. for 5 hours. The bond was then washed with DI water. The bond was dried at 200° C. in vacuo for 60 minutes and the adhesion was determined by means of the Dage series 4000 shear tester. The bonded parts showed no signs of detachment. The bond strength remained unchanged.

| | | |
|---|---|---|
| Comparative example 45 | 7.15 N/mm$^2$ | (glass surface) |
| Comparative example 46 | 9.82 N/mm$^2$ | (glass surface) |

Example 49

Determination of the Stability Toward Bases

The bonds produced in accordance with examples 25, 26, 30 to 32, 34 to 37 or 45 were stored in concentrated potassium hydroxide solution at 40° C. for 24 hours and in concentrated ammonia solution at RT for 24 hours. The bond was then washed with DI water. The bond was dried at 200° C. in vacuo for 60 minutes and the adhesion was determined by means of the Dage series 4000 shear tester. The bonded components showed no signs of detachment. The bond strength remained unchanged. Signs of detachment. The bond strength remained unchanged.

| | | |
|---|---|---|
| Comparative example 45 | 6.25 N/mm$^2$ | (glass surface) |
| Comparative example 46 | 5.47 N/mm$^2$ | (glass surface) |

Example 50

Determination of the Water Absorption

A bond produced in accordance with examples 24 to 43 with a known mass of polybenzoxazole cyanate 1 adhesive was weighed with a DeltaRange AT261 analytical balance and then stored in water at 80° C. for 10 hours. After a short drying step of 15 min at 50° C. in a drying cabinet, the weight was measured again. The percentage water absorption based on the mass of adhesive was calculated from the mass difference.

Water Absorption Found:

| | |
|---|---|
| example 25 | 0.7% |
| example 29 | 1.0% |
| example 31 | 0.8% |
| example 34 | 0.6% |
| example 38 | 0.7% |
| example 41 | 0.9% |
| comparative example 45 | 4.1% |
| comparative example 46 | 3.5% |

Example 51

Determination of the Adhesion After Thermal Loading Test

The bonds produced in accordance with examples 25 to 44 were heated in an oven at 430° C. under nitrogen for 1 hour. After cooling, the shear test was conducted for each of them. The bond strength remained unchanged.

| | | |
|---|---|---|
| Comparative example 45 | 5.94 N/mm$^2$ | (ceramic surface) |
| Comparative example 46 | 3.72 N/mm$^2$ | (ceramic surface) |

Example 52

Determination of the Adhesion After Climatic Test

A [sic] bonds produced in accordance with examples 25 to 44 were subjected to thermal loading in a controlled-climate cabinet, Vötsch VT7004, between −50° C. and 150° C. for 500 cycles. Following this treatment, a shear test was conducted on each of them. The bond strength remained unchanged.

| | | |
|---|---|---|
| Comparative example 45 | 8.73 N/mm$^2$ | (ceramic surface) |
| Comparative example 46 | 6.36 N/mm$^2$ | (ceramic surface) |

Example 53

Determination of the Adhesion at 250° C.

The adhesion of a bond with polybenzoxazole cyanate 1, produced in accordance with examples 24 to 43, was tested at 250° C. on a Dage series 4000 shear tester with hotplate. Average Adhesion Values:

| | |
|---|---|
| example 25 | 15.90 N/mm$^2$ |
| example 27 | 16.23 N/mm$^2$ |
| example 31 | 15.05 N/mm$^2$ |
| example 32 | 15.62 N/mm$^2$ |
| example 40 | 16.27 N/mm$^2$ |
| example 44 | 14.83 N/mm$^2$ |
| comparative example 45 | 9.72 N/mm$^2$ (ceramic suface) |
| comparative example 46 | 7.89 N/mm$^2$ (ceramic surface) |

Example 54

Filling of Narrow Trenches

The polybenzoxazole cyanate 1 was dissolved in NMP in accordance with example 15 (20% strength by weight solution) and the solution was filtered under pressure through a membrane with 0.2 μm pores. This solution was applied by spin coating to a substrate (silicon) on which there were already metallic Al structures. Following application of the solution by spin coating, the coat was dried for 2 minutes each at 100° C., 140° C. and 200° C. on a hotplate and then heat-treated at 350° C. under nitrogen for 1 hour. The metal features, some of which have an aspect ratio of more than 4, the distance between the features being in some cases only 120 nm, are electrically insulated from one another in this operation. The polybenzoxazole cyanurate formed from polybenzoxazole cyanate 1 fills the trenches with no defects. This can be shown by scanning electron microscopy. FIG. 1 shows a typical scanning electron micrograph (SEM) of Al features on a substrate, filled with PBOs of the invention. The polybenzoxazole cyanate or polybenzoxazole cyanurate formed from it has filled out the trenches on the substrate 2, formed by Al features, without blistering.

Example 55

Filling of Narrow Trenches

The experiment is carried out in the same way as in example 54 except that in this case the polybenzoxazole cyanate 2 was used. The result is the same, i.e., the material fills the trenches without defects.

Example 56

Filling of Narrow Trenches

The experiment is carried out in the same way as in example 54 except that in this case the polybenzoxazole cyanate 3 was used. The result is the same, i.e., the material fills the trenches without defects.

Example 57

Filling of Narrow Trenches

The experiment is carried out in the same way as in example 54 except that in this case the polybenzoxazole cyanate 5 was used. The result is the same, i.e., the material fills the trenches without defects.

Example 58

Filling of Narrow Trenches

The experiment is carried out in the same way as in example 54 except that in this case the polybenzoxazole cyanate 7 was used. The result is the same, i.e., the material fills the trenches without defects.

Example 59

Filling of Narrow Trenches

The experiment is carried out in the same way as in example 54 except that in this case the polybenzoxazole cyanate 9 was used. The result is the same, i.e., the material fills the trenches without defects.

Example 60

Filling of Narrow Trenches

The experiment is carried out in the same way as in example 54 except that in this case the polybenzoxazole cyanate 12 was used. The result is the same, i.e., the material fills the trenches without defects.

Example 61

Determination of the Dielectric Constant

The polybenzoxazole cyanate 2 was dissolved in NMP in accordance with example 15 (20% strength solution) and the solution was filtered under pressure through a membrane with 0.2 μm pores. A schematic relating to the measurement of the dielectric constants is shown in FIG. 2. This solution is applied by spin coating to a silicon substrate 3 which already carries a 600 nm thick Ti layer 4. The layer is dried on a hotplate for 2 minutes each at 100° C. and 140° C. and then is heat-treated at 350° C. in a nitrogen atmosphere for one hour. Sputter-coated onto this layer 5 with a thickness of about 1.5 μm, subsequently, using a shadowmask 6 are Ti electrodes (Ti pads) 7 of 6–12 mm in diameter. The dielectric constant, measured in accordance with the scheme in FIG. 2 using an impedance spectrometer 8, is 2.9 in the frequency range from 100 Hz to 1 MHz.

What is claimed is:

1. Phenyl-linked polybenzoxazoles having terminal, aryl- and/or heteroaryl-attached cyanate groups.

2. Polybenzoxazoles according to claim 1, with the following formula (I):

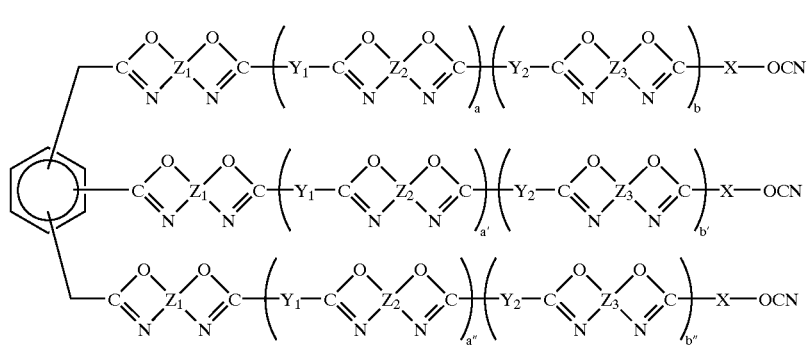

Formula (I)

where for a, a', a", b, b' and b" independently of one another it is the case that:

a, a', a"=0–100;

b, b', b"=0–100;

X has the following definition: substituted or unsubstituted aryl, a substituted or unsubstituted polynuclear aromatic hydrocarbon compound, a substituted or unsubstituted fused ring system or a substituted or unsubstituted heteroaryl radical;

$Y_1$ and $Y_2$ have the following definition, it being possible for $Y_1$ to be the same as or not the same as $Y_2$:

substituted or unsubstituted aryl, a substituted or unsubstituted polynuclear aromatic hydrocarbon compound, a substituted or unsubstituted fused ring system, or alkyl, alkenyl, alkynyl, aralkyl, aralkenyl, aralkynyl, heterocyclo or cycloalkenyl, each substituted or unsubstituted;

and $Z_1$ to $Z_3$ each independently of one another have the following definition:

aryl, aralkyl, aralkenyl, aralkynyl, heteroaryl, each substituted or unsubstituted, a substituted or unsubstituted polynuclear aromatic hydrocarbon compound or a substituted or unsubstituted fused ring system.

3. Polybenzoxazoles according to claim 2, wherein a, a' and/or a" independently of one another are 0–20.

4. Polybenzoxazoles according to claim 3, wherein a, a' and/or a" independently of one another are 1–20.

5. Polybenzoxazoles according to claim 2, wherein b, b' and/or b" independently of one another are 0–20.

6. Polybenzoxazoles according to claim 5, wherein b, b' and/or b" independently of one another are 1–20.

7. Polybenzoxazoles according to claim 1, wherein X has the following definition:

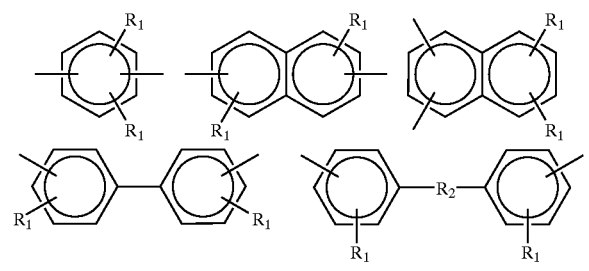

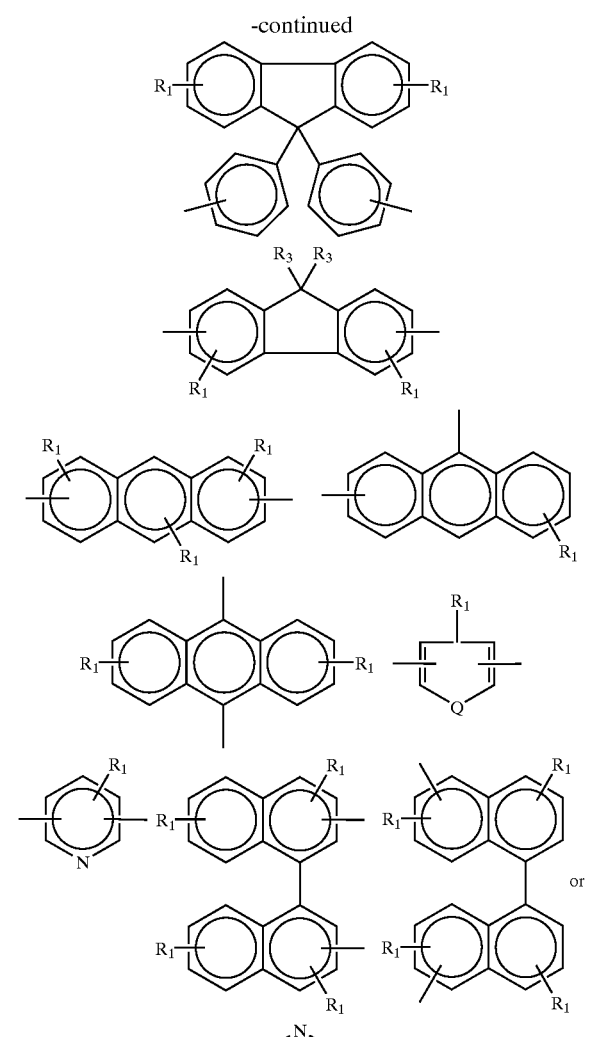

where Q is: —O—, —S— or —NH—;

$R_1$ is: —H, —CF$_3$, —OCN, alkyl or aryl;

$R_2$ is: —O—, —CO—, —NR$_3$—, —S—, —SO$_2$—, —S$_2$—, —CH$_2$—, and also:

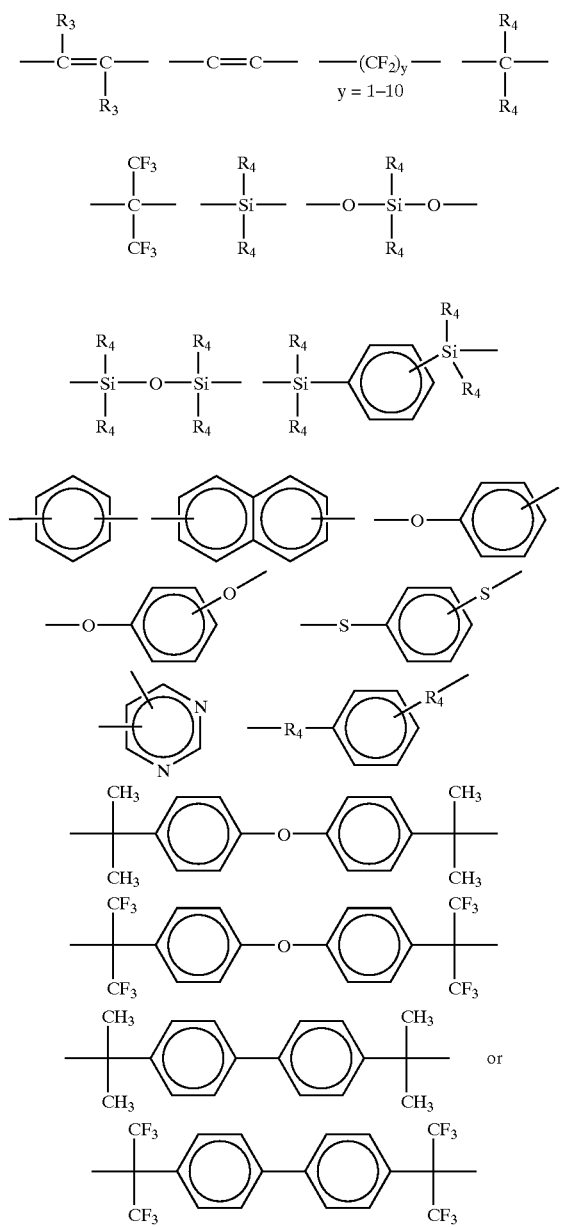
$R_3$ is: —H, and also:
—$(CH_2)_k$—$CH_3$ (k=0–10) —$(CF_2)_k$—$CF_3$ (k=0–10)
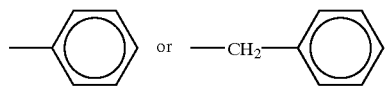
and $R_4$ is: alkyl having from 1 to 10 carbon atoms or aryl.
8. Polybenzoxazoles according to claim 1, wherein $Y_1$ and $Y_2$, where $Y_1$ can be the same as or not the same as $Y_2$, are:
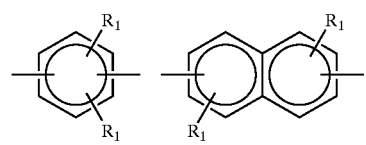
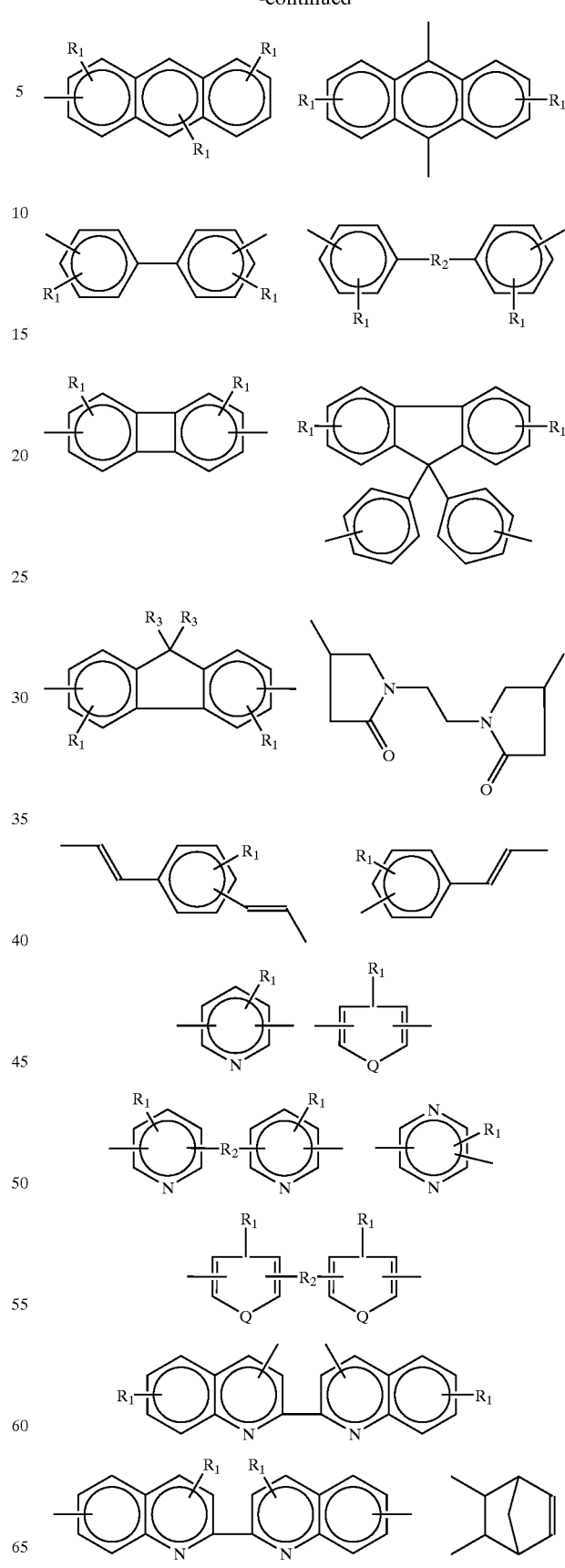

-continued

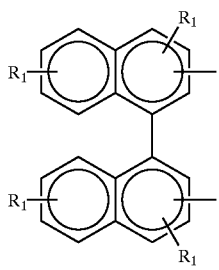

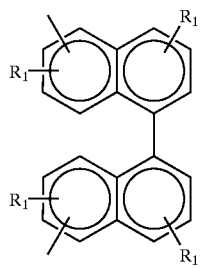

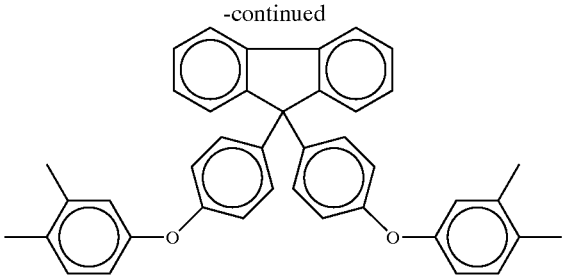

where Q and $R_2$ are as defined in claim 7.

where $R_1$, $R_2$, $R_3$ and Q are as defined in claim 7.

9. Polybenzoxazoles according to claim 1, wherein $Z_1$ to $Z_3$, it being possible for $Z_1$ to $Z_3$ to be the same as or not the same as one another, are:

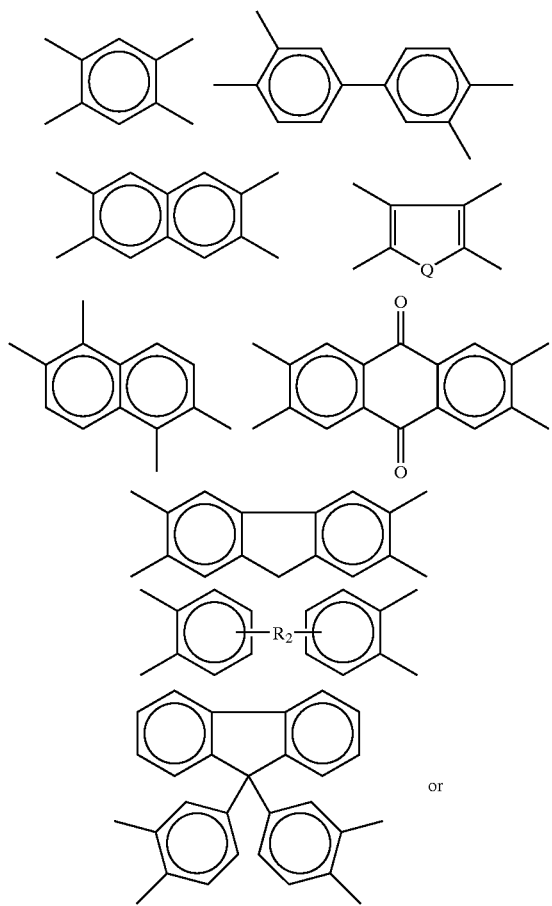

10. Polybenzoxazoles according to claim 1, wherein the polybenzoxazoles comprise a dielectrics in an electronic components.

11. A polybenzoxazole cyanurates produced by crosslinking the polybenzoxazole of claim 1.

12. A process including the step of filling features having narrow gaps, or trenches with a phenyl-linked polybenzoxazole having terminal aryl- and/or heteroaryl-attached cyanate groups.

13. The process according to claim 12, wherein the phenyl-linked polybenzoxazole comprises a dielectric.

14. The process according to claim 12, wherein the trenches are between metallic conductor tracks.

15. The process according to claim 12, wherein the trenches have a gap width of 100 nm or less and an aspect ratio of more than 4.

16. A process for adhesively bonding materials or components with phenyl-linked polybenzoxazoles having terminal aryl- and/or heteroaryl-attached cyanate groups including the steps of:

(a) applying the polybenzoxazoles to the area or areas of the materials or components to be bonded;

(b) contacting the areas to be bonded with one another;

(c) crosslinking the polybenzoxazoles; and (d) optionally baking the materials or components to which the polybenzoxazoles have been applied.

17. The process according to claim 16 including bonding the following materials and/or components of the following materials: aluminum, titanium, vanadium, chromium, manganese, iron, cobalt, nickel, copper, zinc, steel, brass, palladium, silver, tin, tantalum, tungsten, platinum, gold, lead, carbon, including plasma-deposited, carbon-containing layers, carbon fibers, silicon or germanium and/or alloys or compounds of these materials such as silicon carbide, silicon nitride, silicon oxide, titanium nitride, tantalum nitride, silicon oxynitride, tungsten nitride, gallium arsenide, gallium nitride, gallium indium phosphite, indium-tin oxide and/or glasses, ceramics, glass ceramics, clayware, porcelain, stoneware and/or silicates.

18. The process according to claim 16 including adhesively bonding components or materials used in microelectronics and optoelectronics.

19. The process according to claim 16 including adhesively bonding chips and/or wafers.

20. The process according to claim 16 including adhesively bonding ceramics, glass ceramics, glasses, clayware, porcelain, stoneware and/or silicates or minerals, such as marble, basalt, limestone, granite and/or concrete.

21. The process according to claim 16, including applying the polybenzoxazoles having terminal cyanate groups to the substrate to be coated and/or to the material or materials to be adhesively bonded and subsequently, in the case of adhesive bonding following contacting of the areas to be adhesively bonded, crosslinking the polybenzoxazoles having terminal cyanate groups to polybenzoxazole cyanurates.

22. The process according to claim 16, including conducting the crosslinking by means of temperature treatment, laser treatment, ultrasound or microwave treatment.

* * * * *